(12) United States Patent
Lim

(10) Patent No.: US 11,768,774 B2
(45) Date of Patent: *Sep. 26, 2023

(54) NON-VOLATILE DUAL INLINE MEMORY MODULE (NVDIMM) FOR SUPPORTING DRAM CACHE MODE AND OPERATION METHOD OF NVDIMM

(71) Applicant: SAMSUNG ELECTRONICS CO., LTD., Suwon-si (KR)

(72) Inventor: Sunyoung Lim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,054

(22) Filed: Dec. 23, 2022

(65) Prior Publication Data

US 2023/0125624 A1 Apr. 27, 2023

Related U.S. Application Data

(63) Continuation of application No. 16/876,890, filed on May 18, 2020, now Pat. No. 11,537,521.

(60) Provisional application No. 62/857,562, filed on Jun. 5, 2019.

(30) Foreign Application Priority Data

Sep. 10, 2019 (KR) .................. 10-2019-0112369

(51) Int. Cl.
*G06F 12/00* (2006.01)
*G06F 12/0873* (2016.01)
*G06F 12/0831* (2016.01)
*G06F 13/16* (2006.01)
*G06F 12/0853* (2016.01)

(52) U.S. Cl.
CPC ...... *G06F 12/0873* (2013.01); *G06F 12/0831* (2013.01); *G06F 12/0853* (2013.01); *G06F 13/1673* (2013.01); *G06F 13/1689* (2013.01)

(58) Field of Classification Search
CPC ............. G06F 12/0873; G06F 12/0831; G06F 13/1689; G06F 13/1673; G06F 12/0853
See application file for complete search history.

(56) References Cited

U.S. PATENT DOCUMENTS

| 8,171,208 | B2 | 5/2012 | Yano et al. |
| 8,612,676 | B2 | 12/2013 | Dahlen et al. |
| 9,342,453 | B2 | 5/2016 | Nale et al. |
| 9,600,416 | B2 | 3/2017 | Ramanujan et al. |
| 9,619,408 | B2 | 4/2017 | Nale et al. |
| 9,928,168 | B2 | 3/2018 | Molloy et al. |

(Continued)

*Primary Examiner* — Arvind Talukdar
(74) *Attorney, Agent, or Firm* — Sughrue Mion, PLLC

(57) ABSTRACT

Provided are a non-volatile dual inline memory module (NVDIMM) supporting a DRAM cache mode and an operation method of the NVDIMM. The NVDIMM includes a DRAM chip, an NVM chip, and a controller that controls the DRAM chip to operate as a cache memory of the NVM chip. The controller sends a read command to the DRAM chip with reference to a cache address of data requested to be written from a host to the NVM chip, and sends a write command to the NVM chip with reference to an address of the data requested to be written at a time point when a read latency (RL) of the DRAM chip and a write latency (WL) of the NVM chip coincide with each other.

20 Claims, 13 Drawing Sheets

(56) References Cited

U.S. PATENT DOCUMENTS

| | | |
|---|---|---|
| 9,971,697 B2 | 5/2018 | Kim et al. |
| 10,241,943 B2 | 3/2019 | Nale et al. |
| 10,282,294 B2 | 5/2019 | Chang et al. |
| 10,296,230 B1 | 5/2019 | Balakrishnan et al. |
| 2014/0237157 A1 | 8/2014 | Takefman et al. |
| 2015/0003175 A1 | 1/2015 | Ramanujan |
| 2016/0342487 A1 | 11/2016 | Ware et al. |
| 2017/0192888 A1 | 7/2017 | Moon et al. |
| 2017/0322726 A1* | 11/2017 | Walker .................... G06F 12/00 |
| 2017/0357604 A1 | 12/2017 | Lim et al. |
| 2018/0059933 A1 | 3/2018 | Helmick et al. |
| 2018/0059944 A1 | 3/2018 | Helmick et al. |
| 2019/0050331 A1 | 2/2019 | Aneja et al. |
| 2019/0129631 A1 | 5/2019 | Lewis |

* cited by examiner

NON-VOLATILE DUAL INLINE MEMORY MODULE (NVDIMM) FOR SUPPORTING DRAM CACHE MODE AND OPERATION METHOD OF NVDIMM

CROSS-REFERENCE TO RELATED APPLICATIONS

This application is a Continuation of U.S. application Ser. No. 16/876,890 filed May 18, 2020, which claims the benefit of U.S. Provisional Application No. 62/857,562, filed on Jun. 5, 2019 in the U.S. Patent Office, and Korean Patent Application No. 10-2019-0112369, filed on Sep. 10, 2019 in the Korean Intellectual Property Office, the disclosures of which are incorporated herein in their entireties by reference.

BACKGROUND

Embodiments of the present disclosure are related to a memory system, and more particularly, to a non-volatile dual inline memory module (NVDIMM) for supporting a dynamic random-access memory (DRAM) cache mode and an operation method of the NVDIMM.

In a field of information processing devices such as servers, there is an increasing demand for high-speed access of large data such as a database (DB) for the big data era. As for computing capability of information processing devices such as servers that handle big data, data loading capability is a bottleneck. To further improve performance of the information processing devices, it is conceivable to mount a large memory on a central processing unit (CPU) memory bus having a large throughput band.

A type of memory module that includes both volatile and non-volatile memories mounted on the CPU memory bus is being developed. The memory module of this type is called an NVDIMM. The NVDIMM may include a combination of non-volatile memories such as DRAM and a flash memory. Alternatively, the NVDIMM may include a combination of DRAM and a resistive memory of 3D-cross point type that can be overwritten.

The NVDIMM possesses a high-speed processing technology of DRAM and at the same time, a large capacity of non-volatile memory. The NVDIMM is drawing attention as demand grows for big data, cloud, artificial intelligence (AI), a high-speed network, and the like.

SUMMARY

Embodiments of the present disclosure provide a non-volatile dual inline memory module (NVDIMM) for supporting a DRAM cache mode and an operation method of the NVDIMM.

According to an aspect of an example embodiment, there is provided a memory module including first internal data lines; second internal data lines; a volatile memory chip connected to the first internal data lines; a non-volatile memory chip connected to the second internal data lines; a controller connected to the volatile memory chip and the non-volatile memory chip via the first internal data lines and the second internal data lines, the controller being configured to apply a first command related to first data of the volatile memory chip to the volatile memory chip, and apply a second command related to second data of the non-volatile memory chip; and a first data buffer connected to: the volatile memory chip and the controller via the first internal data lines, and connected to a second data buffer outside the memory module, wherein the controller is further configured to, at a time point when a first latency of the first command and a second latency of the second command coincide with each other, perform control such that: the first data is moved from the volatile memory chip to the non-volatile memory chip, or the second data is moved from the non-volatile memory chip to the volatile memory chip.

According to an aspect of an example embodiment, there is provided is a memory module including: first internal data lines; second internal data lines; a volatile memory chip connected to the first internal data lines; a non-volatile memory chip connected to the second internal data lines; a controller connected to the volatile memory chip and the non-volatile memory chip via the first internal data lines and the second internal data lines, the controller configured to apply, at a first time, a first command related to first data of the volatile memory chip to the volatile memory chip, and apply, at a second time, a second command related to second data of the non-volatile memory chip; and a first data buffer connected to the volatile memory chip and the controller via the first internal data lines, the first data buffer being connected to a second data buffer outside the memory module, wherein the controller is further configured to at the second time, apply the second command to the first internal data lines before the first data is output, and control the volatile memory chip as a cache memory of the non-volatile memory chip at a time point when a first latency of the first command and a second latency of the second command coincide with each other.

According to an aspect of an example embodiment, there is provided an operation method, of a memory module including: a non-volatile memory chip, a volatile memory chip, and a controller configured to control the volatile memory chip and the non-volatile memory chip such that the volatile memory chip operates as a cache memory of the non-volatile memory chip, the operation method including: receiving, by the controller, a write request from a host to the non-volatile memory chip; sending, by the controller, a first read command to the volatile memory chip with reference to a cache address of first data requested to be written to the non-volatile memory chip; sending, by the controller, a first write command to the non-volatile memory chip with reference to second data requested to be written; and configuring, by the controller, the first data output from the volatile memory chip in response to the first read command as second data, and controlling the second data to be written to the non-volatile memory chip, wherein the first write command is applied before the first data is output to first internal data lines of the memory module by the first read command after the first read command is applied, and at a time point when a read latency of the first read command and a write latency of the first write command coincide with each other, the second data is written to the non-volatile memory chip.

According to an aspect of an example embodiment, there is an operation method of a memory module including a non-volatile memory chip, a volatile memory chip, and a controller configured to control the volatile memory chip and the non-volatile memory chip such that the volatile memory chip operates as a cache memory of the non-volatile memory chip, the method including: receiving, by the controller, a read request from a host to the non-volatile memory chip; sending, by the controller, a first read command to the non-volatile memory chip with reference to a cache address of data requested to be read from the non-volatile memory chip; sending, by the controller, a first write command to the volatile memory chip with reference to the first data requested to be read; and configuring, by the controller, second data output from the non-volatile memory chip in response to the first read command as first data related with the first write command, and controlling the first data to be written to the volatile memory chip, wherein the first write command is applied before the second data is output to second internal data lines of the memory module by the first read command after the first read command is applied, and writing, at a time point when a read latency of the first read command and a write latency of the first write command coincide with each other, the first data to the volatile memory chip.

BRIEF DESCRIPTION OF THE DRAWINGS

The above and other aspects of example embodiments will be more clearly understood from the following detailed description taken in conjunction with the accompanying drawings in which.

DETAILED DESCRIPTION

Figure 1:
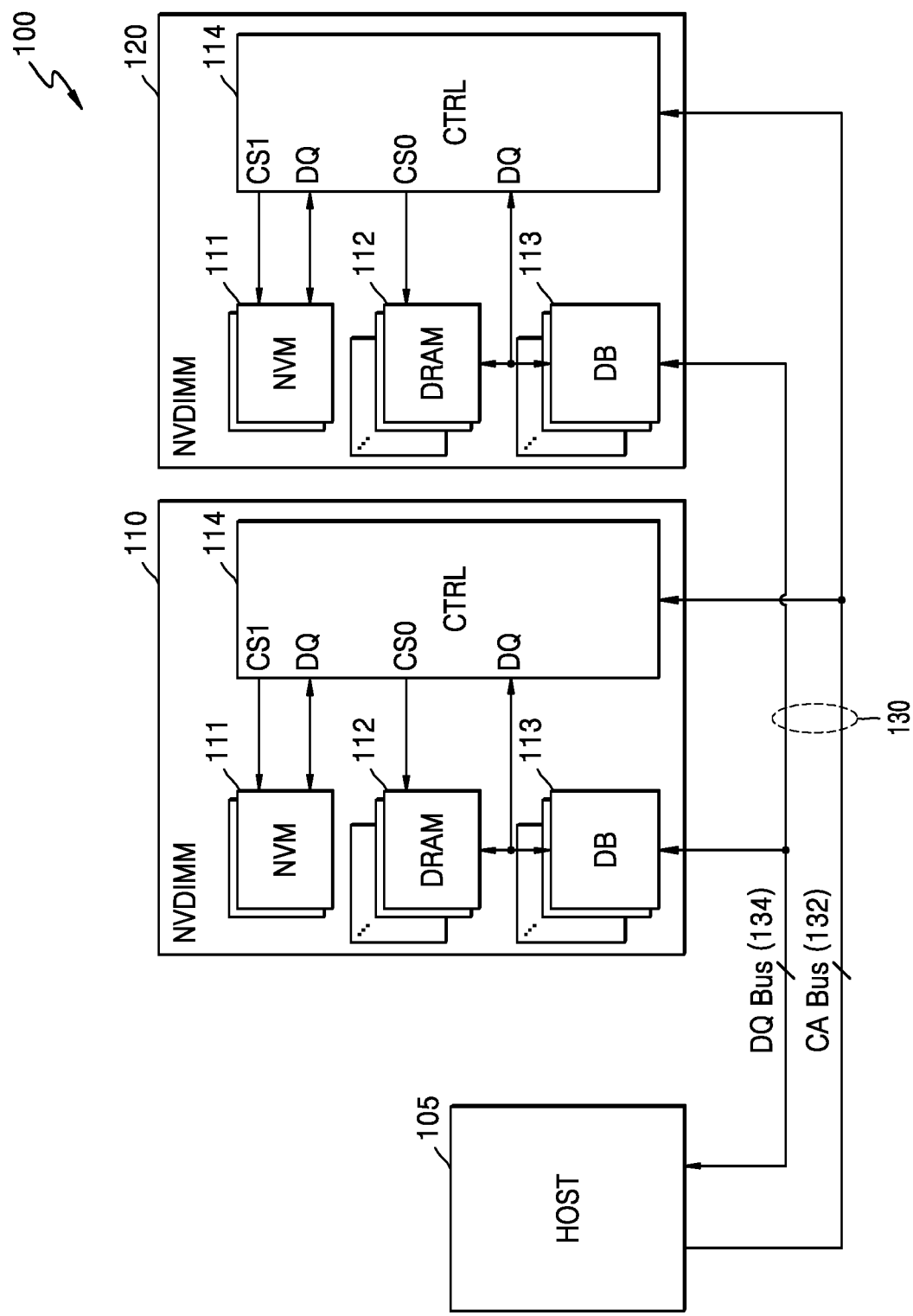
FIG. 1 is a block diagram illustrating a memory system according to an example embodiment.

FIG. 1 is a block diagram illustrating a memory system 100 according to an example embodiment.

Referring to FIG. 1, the memory system 100 may include non-volatile dual inline memory modules (NVDIMM) 110 and 120 coupled to a host 105. The NVDIMMs 110 and 120 may be accessed by the host 105. The host 105 may include a server, a server array or a server farm, a web server, a network server, an internet server, a workstation, a mini-computer, a mainframe computer, a web appliance, a distributed computing system, a multi-processor system, a processor-based system, or a combination thereof. The host 105 may include a processor (e.g., a CPU core), a processor cache, and a memory controller controlling the NVDIMMs 110 and 120. In the present embodiment, two NVDIMMS 110 and 120 in the memory system 100 are described. However, embodiments of the present disclosure are not limited thereto, and the memory system 100 may include various other numbers of memory modules.

Some examples may be described by using expressions of "connected" and/or "coupled" along with their derivatives. These terms may not be necessarily intended as synonyms of each other. For example, descriptions using the terms "connected" and/or "coupled" may indicate that two or more elements are in direct physical or electrical contact with each other. In addition, the term "combined" may also mean that two or more elements are not in direct contact with each other but still cooperate or interact with each other.

The NVDIMMs 110 and 120 may be homogeneous NVDIMMs of the same type, as illustrated in FIG. 1. It should be understood that the NVDIMMs (110 and 120) are examples and do not limit the technical protection scope of the claims. According to an example embodiment, the NVDIMMs 110 and 120 may be heterogeneous NVDIMMs of different types.

Each of the NVDIMMs 110 and 120 may include a plurality of memory chips such as non-volatile memory (NVM) chips 111 and volatile memory chips 112 (hereinafter, referred to as "dynamic RAM (DRAM) chips"). In addition, each of the NVDIMMs 110 and 120 may include a plurality of data buffers 113 connected to the DRAM chips 112. Each of the data buffers 113 may be implemented as a single chip corresponding one-to-one to the DRAM chips 112. In addition, each of the NVDIMMs 110 and 120 may include a controller (CTRL) 114 connected to the NVM chips 111, the DRAM chips 112, and the data buffers 113. The CTRL 114 may be implemented as a single chip that controls the NVM chips 111, the DRAM chips 112, and the data buffers 113. According to an embodiment, the CTRL 114 may be implemented with multiple chips.

The NVM chips 111 may include non-volatile memory devices that store data in a non-volatile manner. For example, the NVM chips 111 may include flash memory devices including flash memory cells. Alternatively, the NVM chips 111 may include memory devices such as resistive RAM (RRAM), magnetic RAM (MRAM), and phase change RAM (PRAM), which include resistive memory cells.

The DRAM chips 112 may represent volatile memory devices. The DRAM chips 112 may include clock synchronous DRAM such as synchronous DRAM (SDRAM). For example, the DRAM chips 112 may include memory devices such as double data rate (DDR) synchronous DRAM (SDRAM) (DDR SDRAM), low power DDR (LPDDR) SDRAM (LPDR SDRAM), graphics DDR (GDDR) SDRAM (GDDR SDRAM), and rambus DRAM (RDRAM).

The NVDIMMs 110 and 120 may be mounted on DIMM sockets installed in a main board of the memory system 100, and be in contact with a memory bus 130. The memory bus 130 may be referred to as signal lines formed on a surface of the main board, or signal lines formed inside the main board of the memory system 100. The host 105 may be connected to the NVDIMMs 110 and 120 via the memory bus 130. The memory bus 130 may include a command/address/control (C/A) bus 132 and a data (DQ) bus 134.

Command signals, address signals, and/or control signals necessary for accessing the NVDIMMs 110 and 120 from the host 105 may be sent via the CA bus. When the NVDIMM 110 is a target memory module that is accessed by the host 105, the host 105 may send to the NVDIMM 110 the command signals, the address signals, and/or the control signals for write/read operations to/from the NVDIMM 110 via the CA bus 132. When the NVDIMM 120 is the target memory module, the host 105 may send to the NVDIMM 120 the command signals, the address signals, and/or the control signals for write/read operations to/from the NVDIMM 120 via the CA bus 132.

Data sent between the host 105 and the NVDIMMs 110 and 120 may be sent via the DQ bus 134. When the NVDIMM 110 is the target memory module, the host 105 may send data to be written in the NVDIMM 110 to the NVDIMM 110 via the DQ bus 134, and receive data DQ to be read from the NVDIMM 110 via the DQ bus 134. When the NVDIMM 120 is the target memory module, the host 105 may send data to be written in the NVDIMM 120 to the NVDIMM 120 via the DQ bus 134, and receive data to be read from the NVDIMM 120 via the DQ bus 134. In the present embodiment, a signal to transmit data may be transmitted through a dedicated pin like the read transmission signal XR_SEND (see FIG. 7) or through coding of the CA bus 132.

The memory system 100 may include an error correcting code (ECC) engine to correct an error bit in signals sent to the NVDIMMs 110 and 120 via the CA bus 132 and in data sent via the DQ bus 134. The ECC engine may be implemented as a hardware circuit including a customized very-large-scale integration (VLSI) circuit or an off-the-shelf semiconductor such as a gate array, a logic chip, a transistor, and other discrete components. The ECC engine may be implemented with a programmable hardware device such as a programmable gate array, a programmable gate logic, and a programmable gate device. In addition, the ECC engine may be implemented by software including executable code, objects, procedures, or functions. Hereinafter, data sent via the CA bus 132 and/or the DQ bus 134 may be understood as error-corrected data.

In each of the NVDIMMs 110 and 120, the plurality of DRAM chips 112 may be driven in response to a first chip select signal CS0, and the plurality of NVM chips 111 may be driven in response to a second chip select signal CS1. In an embodiment, the plurality of DRAM chips 112 may be driven in response to the second chip select signal CS1, and the plurality of NVM chips 111 may be driven in response to the first chip select signal CS0.

When the NVDIMM 110 is the target memory module, the first chip select signal CS0 and the second chip select signal CS1 may be applied from the host 105 to the CTRL 114 via the CA bus 132. When the first chip select signal CS0 is activated, the CTRL 114 may control a write operation to the DRAM chips 112 or a read operation from the DRAM chips 112. When the second chip select signal CS1 is activated, the CTRL 114 may control a write operation to the NVM chips 111 or a read operation from the NVM chips 111.

When the CTRL 114 of the NVDIMM 110 controls the write operation of the DRAM chips 112 based on the first chip select signal CS0, data to be written to the DRAM chips 112 may be applied to the data buffers 113 via the DQ bus 134. The CTRL 114 may receive the data DQ to be written of the data buffers 113 and provide the received data DQ as the data DQ to be written of the DRAM chips 112. The CTRL 114 may control the data DQ to be written, to be written to the DRAM chips 112. When the CTRL 114 of the NVDIMM 110 controls the read operation of the DRAM chips 112 based on the first chip select signal CS0, the CTRL 114 may control such that the data DQ read from the DRAM chips 112 is sent to the DQ bus 134 via the data buffers 113, and is provided to the host 105.

For example, when the NVM chips 111 of the NVDIMM 110 include flash memories, the CTRL 114 may include a flash transition layer (FTL) structure and/or a mapping table structure. The CTRL 114 may manage the write, read, and erase operations of the NVM chips 111 by using the FTL structure and/or the mapping table structure. The FTL structure may perform an address conversion operation that converts an address (for example, a logical address) provided from the host 105 into a physical address representing a physical location of a memory cell to be actually accessed in the NVM chips 111. The FTL structure may generate the physical address in the conversion operation on the logical address according to a mapping unit having a certain size and provide the generated physical address to the NVM chips 111. The mapping table structure may store mapping information between the logical address from the host 105 and the physical address corresponding to the logical address of the NVM chips 111. The CTRL 114 may convert the logical address into the physical address with reference to the mapping information. The NVM chips 111 may write (or program) the data DQ to be written to the memory cells corresponding to the physical addresses.

When the CTRL 114 of the NVDIMM 110 controls the write operation of the NVM chips 111 based on the second chip select signal CS1, the data DQ to be written to the NVM chips 111 may be provided to the data buffers 113 via the DQ bus 134. The CTRL 114 may convert the logical address provided from the host 105 into the physical address, provide the physical address to the NVM chips 111, and provide the data DQ to be written of the data buffers 113 as the data DQ to be written to the NVM chips 111. The NVM chips 111 may write (or program) the data DQ to be written to the memory cells corresponding to the physical addresses. When the CTRL 114 of the NVDIMM 110 controls the read operation of the NVM chips 111 based on the second chip select signal CS1, the CTRL 114 may convert the logical address provided from the host 105 to the physical address and provide the physical address to the NVM chips 111. The NVM chips 111 may read the data DQ from the memory cells corresponding to the physical addresses. The CTRL 114 may receive the data DQ read from the NVM chips 111, process the data DQ by a data access unit, and provide the processed data DQ as read data DQ of the data buffers 113. The CTRL 114 may control the read data DQ of the data buffers 113 to be sent via the DQ bus 134 and provided to the host 105.

In the NVDIMMs 120 as well, the plurality of DRAM chips 112 may be driven in response to the first chip select signal CS0, and the plurality of NVM chips 111 may be driven in response to the second chip select signal CS1. When the NVDIMM 120 is the target memory module, the first chip select signal CS0 and the second chip select signal CS1 may be applied from the host 105 to the CTRL 114 via the CA bus 132. When the first chip select signal CS0 is activated, the CTRL 114 may control the write operation to the DRAM chips 112 or the read operation from the DRAM chips 112. When the second chip select signal CS1 is activated, the CTRL 114 may control the write operation to the NVM chips 111 or the read operation from the NVM chips 111.

The NVDIMMs 110 and 120 may support a DRAM cache mode in which the plurality of DRAM chips 112 operate as cache memories of the NVM chips 111. The NVDIMMs 110 and 120 may receive a write request of the NVM chips 111 from the host 105, send a read command to the NVM chips 111 with reference to a cache address of the data DQ requested to be written to the NVM chips 111, and send the read command to the NVM chips 111 with reference to an address of the data DQ requested to be written at a time point when a read latency (RL) of the plurality of DRAM chips 112 and a write latency (WL) of the NVM chips 111 match each other. The NVDIMMs (110 and 120) may receive a read request of the NVM chips 111 from the host 105, send the read command to the NVM chips 111 with reference to an address of the data DQ requested to be read to the NVM chips 111, and send the write command to the plurality of NVM chips 111 with reference to the cache address of the data DQ requested to be read at a time point when the RL of the plurality of DRAM chips 112 and the WL of the plurality of NVM chips 111 match each other. The NVDIMMs 110 and 120 may restore tag information among addresses of the data DQ requested to be written/read to/from the NVM chips 111 and control the plurality of DRAM chips 112 to operate as cache memories with reference to the restored tag information.

Figure 2:
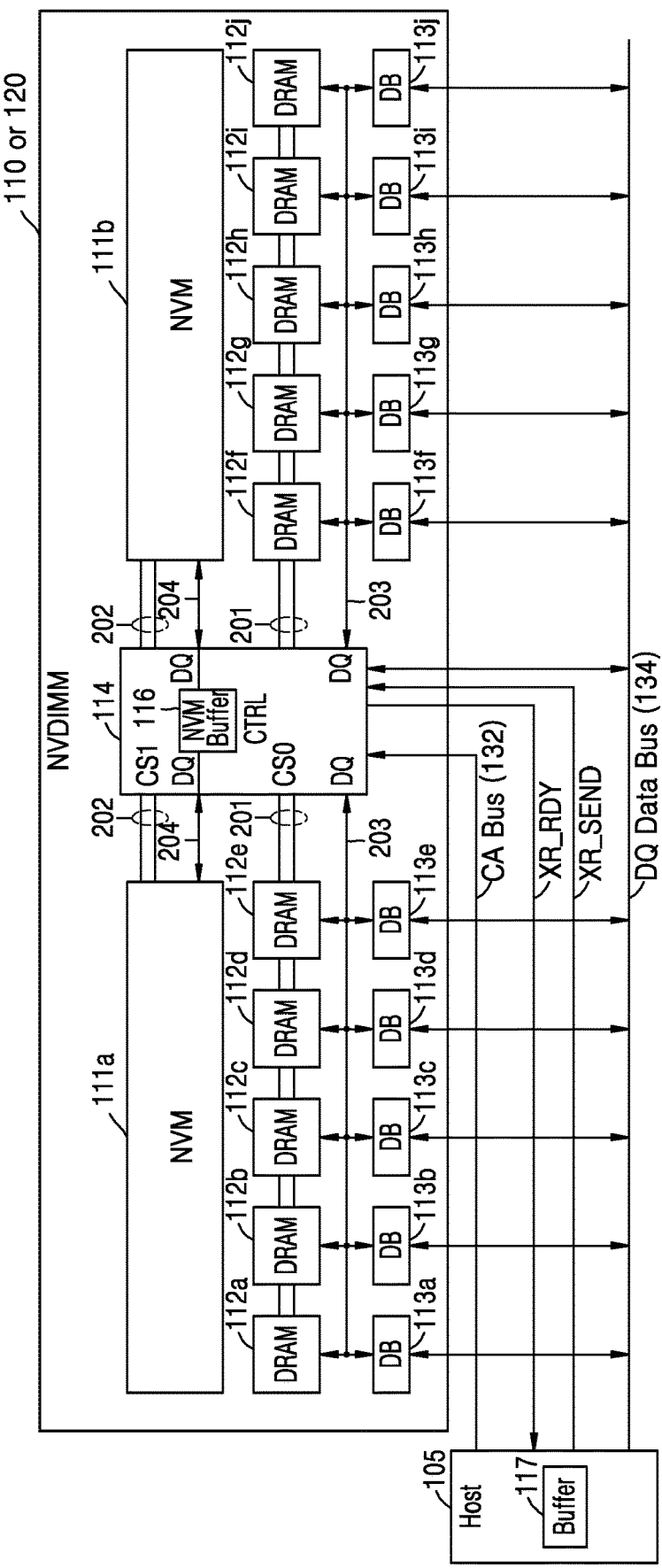
FIG. 2 is an example diagram illustrating a non-volatile dual inline memory module (NVDIMM)

FIG. 2 is an example diagram illustrating an NVDIMM according to an example embodiment.

Referring to FIG. 2, the NVDIMM (for example, NVDIMMs 110 and 120) may include NVM chips 111a and 111b, DRAM chips 112a, 112b, 112c, 112d, 112e, 112f, 112g, 112j, 112i, and 112j, data buffers 113a, 113b, 113c, 113d, 113e, 113f, 113g, 113j, 113i, and 113j, and the CTRL 114. The data buffers 113a, 113b, 113c, 113d, 113e, 113f, 113g, 113j, 113i, and 113j may be connected to the DQ bus 134, and the CTRL 114 may be connected to the CA bus 132 and be coupled to the host (for example, host 105 of FIG. 1). The CTRL 114 may be connected to the DRAM chips 112a through 112j via first internal command address lines 201, and to the NVM chips 111a and 111b via second internal command address lines 202. In addition, the CTRL 114 may be connected to the DRAM chips 112a through 112j via first internal data lines 203 and to the NVM chips 111a and 111b via second internal data lines 204.

The CTRL 114 may receive the command signal, the address signal, and/or the control signal from the host 105 via the CA bus 132. The CTRL 114 may determine whether the received command signal, address signal and/or control signal correspond to the NVM chips 111a and 111b or the DRAM chips 112a through 112j.

When the received command signal, address signal and/or control signal are related with the NVM chips 111a and 111b, the CTRL 114 may send the NVM chips-related command signal, address signal, and/or control signal to the NVM chips 111a and 111b via the second internal command address lines 202. In this case, the second internal command address lines 202 may include the second chip select signal CS1 line, and the second chip select signal CS1 may be in an active state. The NVM chips 111a and 111b may receive the write data to be written to the NVM chips 111a and 111b via the second internal data lines 204, in response to the write command and the address that are received via the second internal command address lines 202. The NVM chips 111a and 111b may output the read data read from the NVM chips 111a and 111b to the second internal data lines 204 in response to the read command and the address that are received via the second internal command address lines 202. The read data read from the NVM chips 111a and 111b may exhibit non-deterministic characteristics in which a read latency distribution varies. The overall data read latency of the NVM chips 111a and 111b may widely vary, but the widely varying read latency may not be allowed. Accordingly, the CTRL 114 may include an NVM buffer 116 that is configured such that the read latency of the NVM chips 111a and 111b has a constant deterministic characteristic, after a consideration of a deterministic upper bound with respect to the read latency of the NVM chips 111a and 111b. In some embodiments, the NVM buffer 116 is coupled to an external buffer 117 via data and control lines. The external buffer 117 is coupled to the CA Bus 132 via control lines and coupled to the Data Bus 134 via data lines. According to an embodiment, the NVDIMMs 110 and 120 may include an NVM controller that controls the NVM chips 111a and 111b separately from the CTRL 114. The NVM buffers 116 may be included in the NVM controller. The read data read from the NVM chips 111a and 111b to be described hereinafter is assumed to have the uniform read latency by the NVM buffer 116. It is noted that the timing diagrams (FIGS. 3, 5, 7, 9, 13 and 14) described in the inventive concept are not necessarily drawn to scale.

When the received command signal, address signal and/or control signal are related with the DRAM chips 112a through 112j, the CTRL 114 may send the DRAM chips-related command signal, address signal, and/or control signal to the DRAM chips 112a through 112j via the first internal command address lines 201. In this case, the first internal command address lines 201 may include the first chip select signal CS0 line, and the first chip select signal CS0 may be in an active state. The DRAM chips 112a through 112j may receive the write data to be written to the DRAM chips 112a through 112j via the first internal data lines 203, in response to the write command and the address that are received via the first internal command address lines 201. The DRAM chips 112a through 112j may output the read data to be read from the DRAM chips 112a through 112j via the first internal data lines 203, in response to the read command and the address that are received via the first internal command address lines 201.

Figure 3:
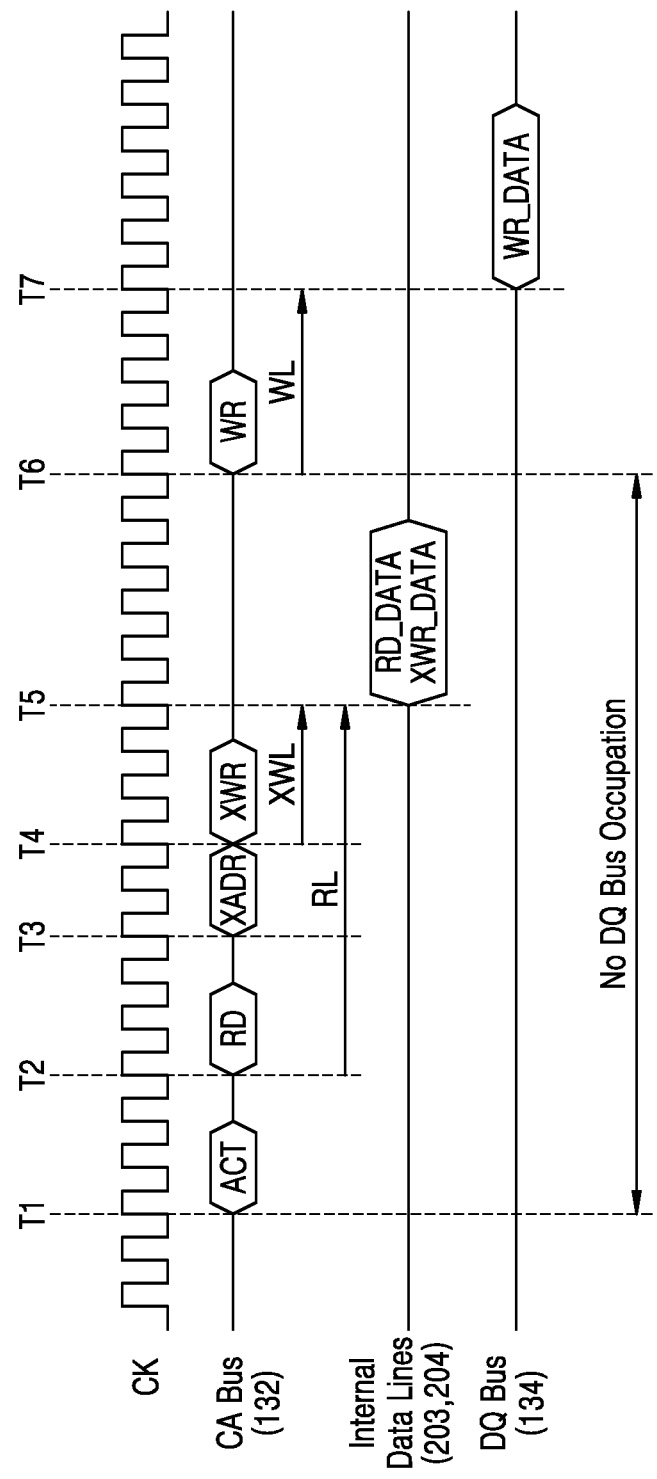
FIG. 3 is a timing diagram illustrating an operation method of the NVDIMM in FIG. 2.

FIG. 3 is a timing diagram illustrating an operation method of the NVDIMMs 110 and 120 in FIG. 2. In FIG. 3, as a timing diagram in which the host (for example, host 105 of FIG. 1) and the NVDIMMs 110 and 120 operate based on a clock signal CK according to communication protocols or standards, the timing diagram responding to the write request from the host 105 to the NVM chips 111 is illustrated. Hereinafter, it is assumed that the write request to the NVDIMM 110 occurs in the NVDIMMs 110 and 120 of the memory system 100 of FIG. 1.

Referring to FIGS. 2 and 3, the NVDIMM 110 may receive the write request from the host 105 to the NVM chips 111. In general, the host 105 may verify whether pieces of data requested to be written to the NVM chips 111 are in a state of being cached in the DRAM chips 112. After the host 105 verifies whether a cache hit has occurred, in the case of the cache hit, the host 105 may send a cache flush request to the DRAM chips 112.

However, in the present embodiment, the host 105 may not need to verify whether the cache hit has occurred. In other words, the host 105 may issue the write request without a need to determine the cache state of the DRAM chips 112, such as the cache hit and a cache miss. Then, the CTRL 114 of the NVDIMM 110 may receive the write request from the host 105 to the NVM chips 111.

At a time point T1, the CTRL 114 may read a cache area corresponding to cache addresses of the DRAM chips 112 of the data that has been requested to be written to the NVM chips 111. To this end, the CTRL 114 may receive an active command ACT related with the DRAM chips 112 with reference to the cache address (for example, a row address) via the CA bus 132. The DRAM chips 112 may receive the cache address and the active command ACT from the CTRL 114 via the first internal command address lines 201, and perform a row active operation in response to the cache address and the active command ACT.

At a time point T2, the CTRL 114 may receive a read command RD related with the DRAM chips 112 with reference to the cache address (for example, a column address) via the CA bus 132. The DRAM chips 112 may receive the cache address and the read command RD from the CTRL 114 via the first internal command address lines 201 and perform the read operation in response to the cache address and the read command RD. The DRAM chips 112 may perform the read operation and output read data RD_DATA after the read latency RL from the time point when the read command RD has been received. The read data RD_DATA output from the DRAM chips 112 may be provided to the CTRL 114 via the first internal data lines 203 of the NVDIMM 110. In this case, the CTRL 114 may control the read data RD_DATA output from the DRAM chips 112 not to be provided to the DQ bus 134 via the data buffers 113.

In an interval in which the active command ACT at the time point T1 and the read command RD at the time point T2 are applied to the DRAM chips 112, the first chip select signal CS0 line among the first internal command address lines 201 may be provided in an activated state.

At a time point T3, the CTRL 114 may receive an address XADR of data requested to be written to the NVM chips 111 via the CA bus 132. The NVM chips 111 may receive the address XADR from the CTRL 114 via the second internal command address lines 202. For convenience of description, the "X" indicator may be intended to be related with the NVM chips 111. For example, the address XADR, commands (XWR and XRD), signals (XR_RDY and XR_SEND) and data XRD_DATA related with the NVM chips 111 may include the "X" indicator.

At a time point T4, the CTRL 114 may receive a first write command XWR related with the NVM chips 111 via the CA bus 132. The first write command XWR may be applied by the read command RD before an operation of outputting the read data RD_DATA of the DRAM chips 112 to the first internal data lines 203 is completed. The NVM chips 111 may receive the first write command XWR from the CTRL 114 via the second internal command address lines 202, and perform a write operation in response to the address XADR and the first write command XWR. The NVM chips 111 may perform the write operation after a first write latency XWL from the first write command XWR.

At a time point T5, the CTRL 114 may configure the read data RD_DATA of the DRAM chips 112 provided via the first internal data lines 203 as write data WR_DATA and provide the second write data WR_DATA to the NVM chips 111 via the second internal data lines 204. The NVM chips 111 may write data XWR_DATA to the memory cells corresponding to the address XADR. In other words, the CTRL 114 may flush the read data RD_DATA of the DRAM chips 112 to the NVM chips 111.

In an interval in which the address XADR at the time point T3, the first write command XWR at the time point T4, and the first write data XWR_DATA at the time point T5 are applied to the NVM chips 111, a second chip select signal CS1 line among the second internal command address lines 202 may be provided in an activated state.

In this case, the time point T5 may be a time point when the DRAM chips 112 output the read data RD_DATA to the first internal data lines 203 after the read latency RL from the time point when the read command RD has been received and may be configured to coincide with a time point when the NVM chips 111 perform the write operation after the first write latency XWL from the first write command XWR. Accordingly, the read data RD_DATA of the DRAM chips 112 may be directly sent to the NVM chips 111 as the first write data XWR_DATA of the NVM chips 111 via the internal data lines 203, and may be flushed.

At a time point T6, the CTRL 114 may receive a second write command WR via the CA bus 132. The DRAM chips 112 may receive the cache address and the second write command WR from the CTRL 114 via the first internal command address lines 201 and perform the write operation in response to the cache address and the second write command WR. The DRAM chips 112 may perform the write operation after a second write latency WL from the second write command WR.

At a time point T7, the CTRL 114 may receive the second write request data WR_DATA via the DQ bus 134. The DRAM chips 112 may receive the second write data WR_DATA requested via the first internal data lines 203 after the second write latency WL from the second write command WR, and write the second write data WR_DATA requested to be written to the memory cells corresponding to the cache address.

In the cache operation of the NVDIMM 110 described above, it may be understood that the interval between the time point T1 and the time point T6 does not carry any data DQ related with the cache operation on the DQ bus 134. The host 105 may be aware that no data DQ related with the cache operation of the NVDIMM 110 is loaded on the DQ bus 134 during the period between the time point T1 and the time point T6. The host 105 may perform data transaction operations with other apparatus(es) connected to the DQ bus 134 during this interval by using the DQ bus 134. Other "apparatuses" connected to the DQ bus 134 as used herein may be any of various structures, for example, circuits or circuitries, a die or dies, a module or modules, a device or devices, a systems or systems, or a combination of structures. Accordingly, the host 105 may efficiently use the DQ bus 134 even in the cache operation of the NVDIMM 110.

Figure 4:
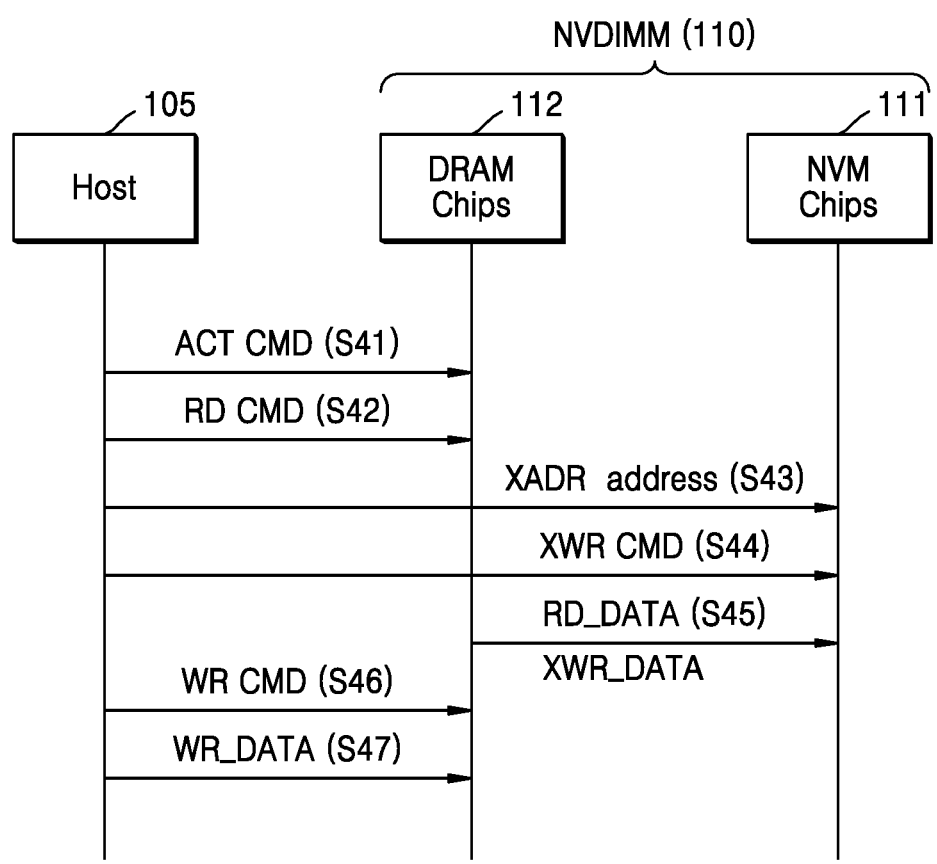
FIG. 4 is a diagram illustrating a process of the NVDIMM, according to the timing diagram of FIG. 3.

FIG. 4 is a diagram illustrating a process of the NVDIMM 110, according to the timing diagram of FIG. 3.

Referring to FIG. 4 in conjunction with FIGS. 2 and 3, the host 105 may issue a write request to the NVM chips 111 of the NVDIMM 110.

The active command ACT may be provided to the DRAM chips 112 from the host 105 (S41). The host 105 may provide the cache addresses of the DRAM chips 112 of data requested to be written to the NVM chips 111 to the DRAM chips 112 together with the active command ACT.

The read command RD may be provided to the DRAM chips 112 from the host 105 (S42). The host 105 may provide the cache addresses of the DRAM chips 112 to the DRAM chips 112 together with the read command RD. The DRAM chips 112 may perform the read operation in response to the cache address and the read command RD. The DRAM chips 112 may perform the read operation and output read data RD_DATA after the read latency RL from the time point when the read command RD has been received.

An address XADR of data requested to be written to the NVM chips 111 may be provided from the host 105 to the NVM chips 111 (S43).

The first write command XWR may be provided to the NVM chips 111 from the host 105 (S44). The NVM chips 111 may perform the write operation in response to the address XADR and the first write command XWR. The NVM chips 111 may perform the write operation after a first write latency XWL from the first write command XWR.

A time point when the DRAM chips 112 output the read data RD_DATA to the first internal data lines 203 of the NVDIMM 110 after the read latency RL from the read command RD in operation S43 and a time point when the NVM chips 111 perform the write operation after the first write latency XWL from the first write command XWR in operation S44 may be configured to match each other.

The read data RD_DATA of the DRAM chips 112 may be provided to the NVM chips 111 via the second internal data lines 204 (S45). The NVM chips 111 may write the received read data RD_DATA as the first write data XWR_DATA.

The second write command WR may be provided to the DRAM chips 112 from the host 105 (S46). The DRAM chips 112 may perform the write operation in response to the second write command WR. The DRAM chips 112 may perform the write operation after the second write latency WL from the second write command WR.

The second write data WR_DATA requested to be written to the NVM chips 111 may be provided from the host 105 to the DRAM chips 112 (S47). The DRAM chips 112 may write the second write data WR_DATA requested to be written after the second write latency WL from the second write command WR.

Figure 5:
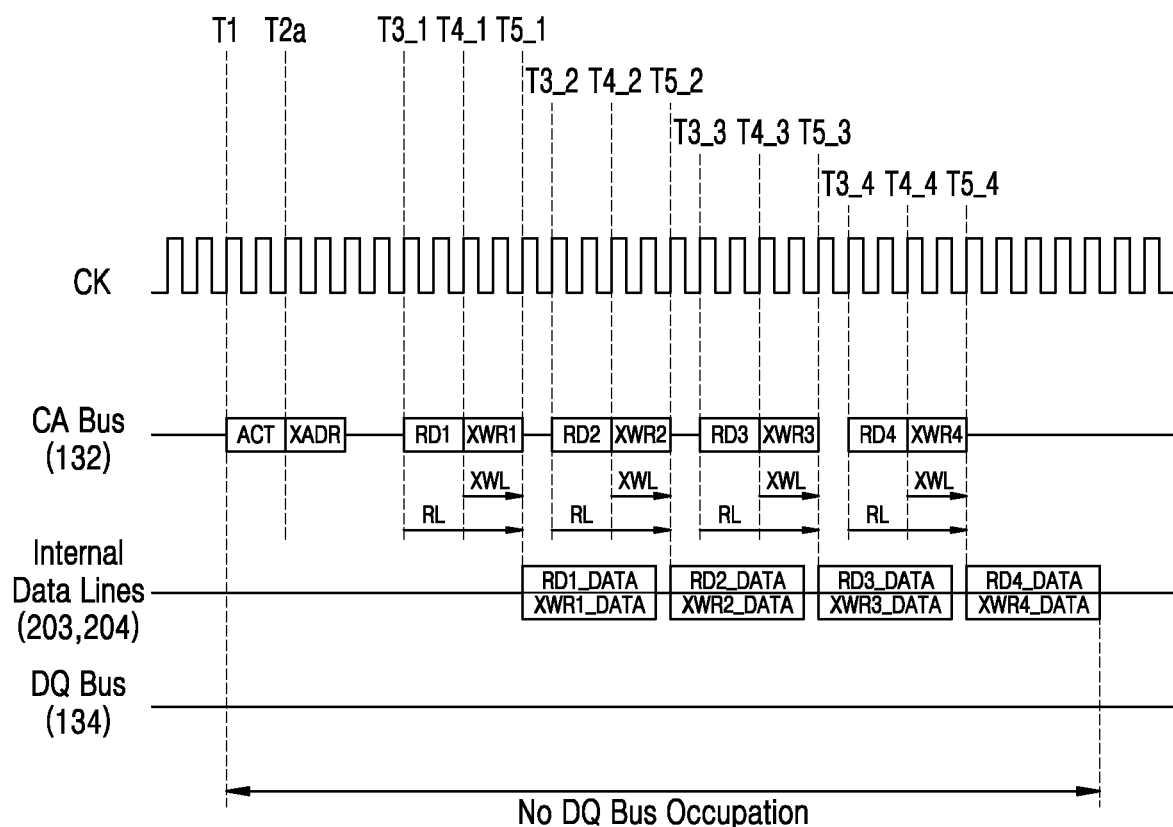
FIG. 5 is a timing diagram illustrating an operation method of the NVDIMMs in FIG. 2.

FIG. 5 is a timing diagram illustrating an operation method of the NVDIMMs 110 and 120) in FIG. 2. FIG. 5 illustrates a cache line flush operation that is performed in an interleaving manner between DRAM chips 112 and NVM chips 111, and is associated with the write request from host 105 to the NVM chips 111 of NVDIMM 110.

In an example embodiment, the amount of data related with the flush operation may be represented by the number of chunks of data. The chunks of data may be an amount of data transferred between DRAM chips 112 and NVM chips 111. In addition, the chunks of data may be an ECC execution unit for correcting an error bit in the CTRL 114. For example, the read command RD for DRAM chips 112 may be related with four data chunks in the write request to NVM chips 111. Accordingly, the host 105 may provide, for the cache line flush operation related with the four data chunks, first through fourth read commands RD1 through RD4 to the DRAM chips 112, and first through fourth write commands XRR1 through XWR4 to the NVM chips 111.

Referring to FIGS. 2 and 5, the CTRL 114 of the NVDIMM 110 may receive the write request from the host 105 to the NVM chips 111.

At the time point T1, the CTRL 114 may, to read the cache area corresponding to the cache address of the DRAM chips 112 of the data requested to be written to the NVM chips 111, receive the active command ACT related with the DRAM chips 112 by referring to the cache address via the CA bus 132. The DRAM chips 112 may receive the cache address and the active command ACT from the CTRL 114 via the first internal command address lines 201, and perform a row active operation in response to the cache address and the active command ACT. In this case, the first chip select signal CS0 line among the first internal command address lines 201 may be provided in an activated state to the DRAM chips 112.

At a time point T2a, the CTRL 114 may receive the address XADR of data requested to be written to the NVM chips 111 via the CA bus 132. The NVM chips 111 may receive the address XADR from the CTRL 114 via the second internal command address lines 202. In this case, the second chip select signal CS1 line among the second internal command address lines 202 may be provided in an activated state to the NVM chips 111.

At a time point T31, the CTRL 114 may receive the first read command RD1 related with the DRAM chips 112 with reference to the cache address via the CA bus 132. The DRAM chips 112 may receive the cache address and the first read command RD1 from the CTRL 114 via the first internal command address lines 201 and perform the read operation in response to the cache address and the read command RD1. The DRAM chips 112 may perform the read operation and output a first read data RD_DATA after the read latency RL from the first read command RD1. The first read data RD1_DATA output from the DRAM chips 112 may be provided to the CTRL 114 via the first internal data lines 203. In this case, the CTRL 114 may control the first read data RD1_DATA on the first internal data lines 203 not to be provided to the DQ bus 134 via the data buffers 113.

At a time point T41, the CTRL 114 may receive the first write command XWR1 related with the NVM chips 111 via the CA bus 132. The first write command XWR1 may be applied by the first read command RD1 before an operation of outputting the first read data RD1_DATA of the DRAM chips 112 to the first internal data lines 203 is completed. The NVM chips 111 may receive the first write command XWR from the CTRL 114 via the second internal command address lines 202 and perform a write operation in response to the address XADR and the first write command XWR1. The NVM chips 111 may perform the write operation after the write latency XWL from the first write command XWR1.

At a time point T5_1, the CTRL 114 may configure the first read data RD1_DATA of the DRAM chips 112 provided via the first internal data lines 203 as a first data chunk, configure the first read data RD1_DATA as first write data XWR1_DATA, and provide the first write data XWR1_DATA to the NVM chips 111. In other words, the CTRL 114 may flush the first read data RD1_DATA of the DRAM chips 112 as the first write data XWR1_DATA to the NVM chips 111 via the second internal data lines 204. The NVM chips 111 may write the first write data XWR1_DATA to the memory cells related with the address XADR of data requested to be written.

At a time point T3_2, the CTRL 114 may receive the second read command RD2 related with the DRAM chips 112 with reference to the cache address via the CA bus 132. A command XWR2 is received at T4_2. At time T5_2 events similar to those at T5_1 occur (provide data to the NVM chips 111). The DRAM chips 112 may receive the cache address and the second read command RD2 from the CTRL 114 via the first internal command address lines 201, and perform the read operation in response to the cache address and the second read command RD2. The DRAM chips 112 may perform the read operation and output the second read data RD2_DATA after the read latency RL from the second read command RD2. The second read data RD2_DATA output from the DRAM chips 112 may be provided to the CTRL 114 via the first internal data lines 203. In this case, the CTRL 114 may control the second read data RD2_DATA on the first internal data lines 203 not to be provided to the DQ bus 134 via the data buffers 113.

At a time point T4_1, the CTRL 114 may receive the second write command XWR2 related with the NVM chips 111 via the CA bus 132. The second write command XWR2 may be applied by the second read command RD2 before an operation of outputting the second read data RD2_DATA of the DRAM chips 112 to the first internal data lines 203 is completed. The NVM chips 111 may receive the second write command XWR2 from the CTRL 114 via the second internal command address lines 202, and perform the write operation in response to the address XADR and the second write command XWR2. The NVM chips 111 may perform the write operation after a write latency XWL from the second write command XWR2.

At a time point T5_2, the CTRL 114 may configure the second read data RD2_DATA of the DRAM chips 112 provided via the first internal data lines 203 as a second data chunk, configure the second read data RD2_DATA as the second write data XWR2_DATA, and provide the second write data XWR2_DATA to the NVM chips 111. In other words, the CTRL 114 may flush the second read data RD2_DATA of the DRAM chips 112 as the second write data XWR2_DATA to the NVM chips 111 via the second internal data lines 204. The NVM chips 111 may write the second write data XWR2_DATA to the memory cells related with the address XADR of data requested to be written.

At a time point T3_3, the CTRL 114 may receive the third read command RD3 related with the DRAM chips 112 with reference to the cache address via the CA bus 132. The DRAM chips 112 may receive the cache address and the third read command RD3 from the CTRL 114 via the first internal command address lines 201, and perform the read operation in response to the cache address and the third read command RD3. The DRAM chips 112 may perform the read operation and output the third read data RD3_DATA after the read latency RL from the third read command RD3. The third read data RD3_DATA output from the DRAM chips 112 may be provided to the CTRL 114 via the first internal data lines 203. In this case, the CTRL 114 may control the third read data RD3_DATA on the first internal data lines 203 not to be provided to the DQ bus 134 via the data buffers 113.

At a time point T4_3, the CTRL 114 may receive the third write command XWR3 related with the NVM chips 111 via the CA bus 132. The third write command XWR3 may be applied by the third read command RD3 before an operation of outputting the third read data RD3_DATA of the DRAM chips 112 to the first internal data lines 203 is completed. The NVM chips 111 may receive the third write command XWR3 from the CTRL 114 via the second internal command address lines 202, and perform the write operation in response to the address XADR and the third write command XWR3. The NVM chips 111 may perform the write operation after the write latency XWL from the third write command XWR3.

At a time point T5_3, the CTRL 114 may configure the third read data RD3_DATA of the DRAM chips 112 provided via the first internal data lines 203 as a third data chunk, configure the third read data RD3_DATA as the third write data XWR3_DATA, and provide the third write data XWR3_DATA to the NVM chips 111. In other words, the CTRL 114 may flush the third read data RD3_DATA of the DRAM chips 112 as the third write data XWR3_DATA to the NVM chips 111 via the second internal data lines 204. The NVM chips 111 may write the third write data XWR3_DATA to the memory cells related with the address XADR of data requested to be written.

At a time point T3_4, the CTRL 114 may receive the fourth read command RD4 related with the DRAM chips 112 with reference to the cache address via the CA bus 132. The DRAM chips 112 may receive the cache address and the fourth read command RD4 from the CTRL 114 via the first internal command address lines 201 and perform the read operation in response to the cache address and the fourth read command RD4. The DRAM chips 112 may perform the read operation and output the fourth read data RD4_DATA after the read latency RL from the fourth read command RD4. The fourth read data RD4_DATA output from the DRAM chips 112 may be provided to the CTRL 114 via the first internal data lines 203. In this case, the CTRL 114 may control the fourth read data RD4_DATA on the first internal data lines 203 not to be provided to the DQ bus 134 via the data buffers 113.

At a time point T4_4, the CTRL 114 may receive the fourth write command XWR4 related with the NVM chips 111 via the CA bus 132. The fourth write command XWR4 may be applied by the fourth read command RD4 before an operation of outputting the fourth read data RD4_DATA of the DRAM chips 112 to the first internal data lines 203 is completed. The NVM chips 111 may receive the fourth write command XWR4 from the CTRL 114 via the second internal command address lines 202, and perform the write operation in response to the address XADR and the fourth write command XWR4. The NVM chips 111 may perform the write operation after the write latency XWL from the fourth write command XWR4.

At a time point T5_4, the CTRL 114 may configure the fourth read data RD4_DATA of the DRAM chips 112 provided via the first internal data lines 203 as a fourth data chunk, configure the fourth read data RD4_DATA as the fourth write data XWR4_DATA, and provide the fourth write data XWR4_DATA to the NVM chips 111. In other words, the CTRL 114 may flush the fourth read data RD4_DATA of the DRAM chips 112 as the fourth write data XWR4_DATA to the NVM chips 111 via the second internal data lines 204. The NVM chips 111 may write the fourth write data XWR4_DATA to the memory cells related with the address XADR of data requested to be written.

As described above, in a cache line flush operation that is performed in an interleaving manner between DRAM chips 112 and NVM chips 111 and is related with the write request from host 105 to the NVM chips 111 of NVDIMM 110, DQ bus 134 may not load any data DQ related with the cache line flush operation. The host 105 may perform a data transaction operation with other device(s) connected to the DQ bus 134, during an interval in which no data DQ related with the cache line flush operation of the NVDIMM 110 is loaded on the DQ bus 134. Accordingly, the DQ bus 134 may be efficiently utilized even in the interleaving cache line flush operation of the NVDIMM 110.

Figure 6:
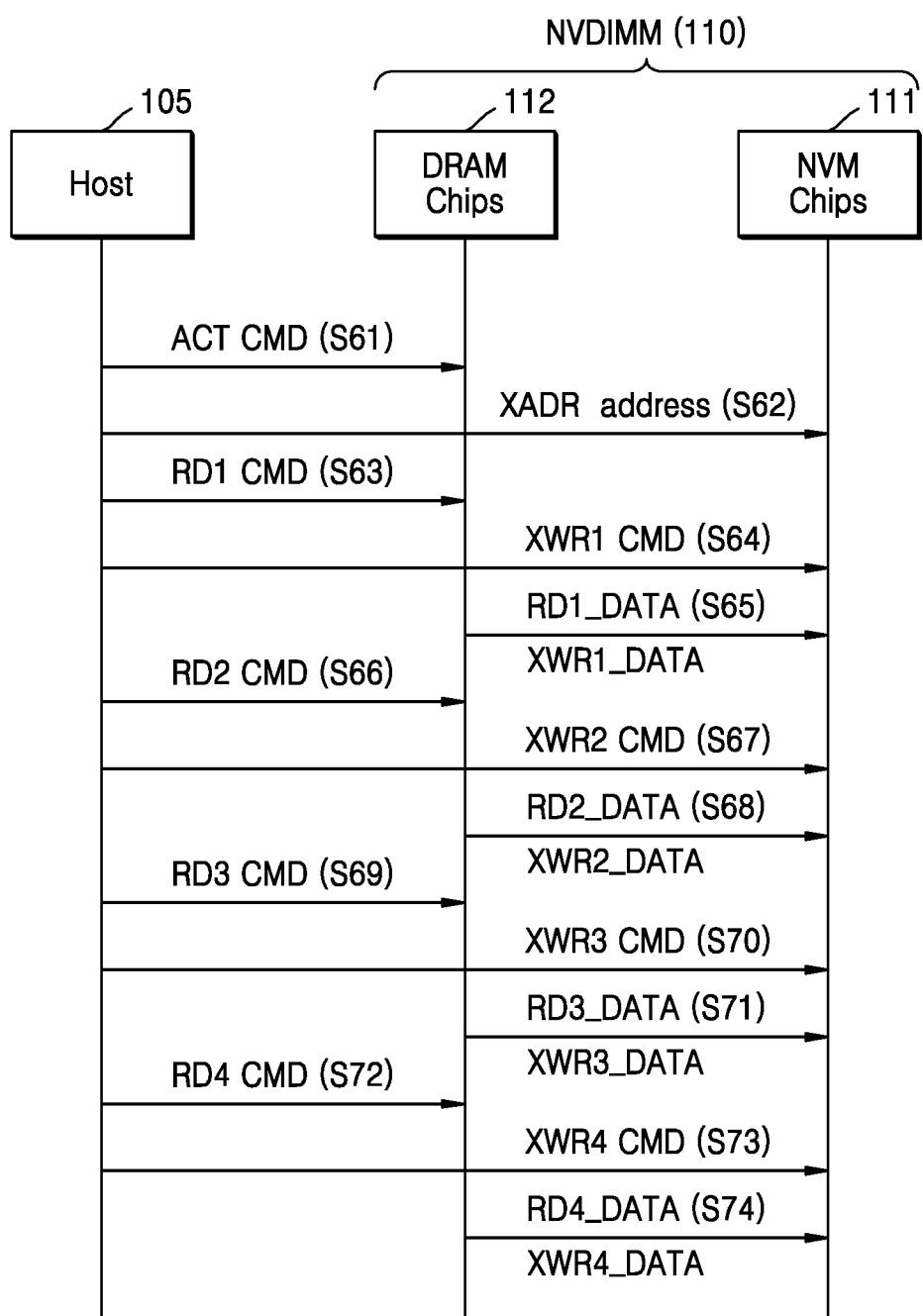
FIG. 6 is a diagram illustrating a process of the NVDIMM, according to the timing diagram of FIG. 5.

FIG. 6 is a diagram illustrating a process of the NVDIMM 110, according to the timing diagram of FIG. 5.

Referring to FIG. 6 in conjunction with FIGS. 2 and 5, the NVDIMM 110 may be related with the write request from the host 105 to the NVM chips 111 and may perform the cache line flush operation in the interleaving manner between the DRAM chips 112 and the NVM chips 111.

The active command ACT may be provided to the DRAM chips 112 from the host 105 (S61). The host 105 may provide the cache addresses of the DRAM chips 112 of data requested to be written to the NVM chips 111 to the DRAM chips 112 together with the active command ACT.

An address XADR of data requested to be written to the NVM chips 111 may be provided from the host 105 to the NVM chips 111 (S62).

The first read command RD1 may be provided to the DRAM chips 112 from the host 105 (S63). The host 105 may provide a first cache address of the DRAM chips 112 to the DRAM chips 112 together with the first read command RD1. The DRAM chips 112 may perform the read operation in response to the first cache address and the first read command RD1. The DRAM chips 112 may perform the read operation and output a first read data RD_DATA after the read latency RL from the first read command RD1.

The first write command XWR1 may be provided to the NVM chips 111 from the host 105 (S64). The NVM chips 111 may perform the write operation in response to the address XADR and the first write command XWR1. The NVM chips 111 may perform the write operation after the write latency XWL from the first write command XWR1.

When a time point at which the DRAM chips 112 output the first read data RD1_DATA after the read latency RL from the first read command RD1 to the CTRL 114 via the first internal data lines 203 and a time point at which the NVM chips 111 performs the write operation after the write latency from the first write command XWR match each other, the CTRL 114 may provide the first read data RD1_DATA of the DRAM chips 112 to the NVM chips 111 via the second internal data lines 204 (S65). The NVM chips 111 may write the received first read data RD1_DATA as the first write data XWR1_DATA.

The second read command RD2 may be provided to the DRAM chips 112 from the host 105 (S66). The host 105 may provide a second cache address of the DRAM chips 112 to the DRAM chips 112 together with the second read command RD2. The DRAM chips 112 may perform the read operation in response to the second cache address and the second read command RD2. The DRAM chips 112 may perform the read operation and output the second read data RD2_DATA after the read latency RL from the second read command RD2.

The second write command XWR2 may be provided to the NVM chips 111 from the host 105 (S67). The NVM chips 111 may perform the write operation in response to the address XADR and the second write command XWR2. The NVM chips 111 may perform the write operation after the write latency XWL from the second write command XWR2.

When a time point at which the DRAM chips 112 output the second read data RD2_DATA after the read latency RL from the second read command RD2 to the CTRL 114 via the first internal data lines 203 and a time point at which the NVM chips 111 perform the write operation after the write latency XWL from the second write command XWR2 match each other, the CTRL 114 may provide the second read data RD2_DATA of the DRAM chips 112 to the NVM chips 111 via the second internal data lines 204 (S68). The NVM chips 111 may write the received second read data RD2_DATA as the second write data XWR2_DATA.

The third read command RD3 may be provided to the DRAM chips 112 from the host 105 (S69). The host 105 may provide a third cache address of the DRAM chips 112 to the DRAM chips 112 together with the third read command RD3. The DRAM chips 112 may perform the read operation in response to the third cache address and the third read command RD3. The DRAM chips 112 may perform the read operation and output the third read data RD3_DATA after the read latency RL from the third read command RD3.

The third write command XWR3 may be provided to the NVM chips 111 from the host 105 (S70). The NVM chips 111 may perform the write operation in response to the address XADR and the third write command XWR3. The NVM chips 111 may perform the write operation after the write latency XWL from the third write command XWR3.

When a time point at which the DRAM chips 112 output the third read data RD3_DATA after the read latency RL from the third read command RD3 to the CTRL 114 via the first internal data lines 203 and a time point at which the NVM chips 111 perform the write operation after the write latency XWL from the third write command XWR3 match each other, the CTRL 114 may provide the third read data RD3_DATA (S71) of the DRAM chips 112 to the NVM chips 111 via the second internal data lines 204 (S68). The NVM chips 111 may write the received third read data RD3_DATA as the third write data XWR3_DATA.

The fourth read command RD4 may be provided to the DRAM chips 112 from the host 105 (S72). The host 105 may provide a fourth cache address of the DRAM chips 112 to the DRAM chips 112 together with the fourth read command RD4. The DRAM chips 112 may perform the read operation in response to the fourth cache address and the fourth read command RD4. The DRAM chips 112 may perform the read operation and output the fourth read data RD4_DATA after the read latency RL from the fourth read command RD4.

The fourth write command XWR4 may be provided to the NVM chips 111 from the host 105 (S73). The NVM chips 111 may perform the write operation in response to the address XADR and the fourth write command XWR4. The NVM chips 111 may perform the write operation after the write latency XWL from the fourth write command XWR4.

When a time point at which the DRAM chips 112 output the fourth read data RD4_DATA after the read latency RL from the fourth read command RD4 to the CTRL 114 via the first internal data lines 203 and a time point at which the NVM chips 111 perform the write operation after the write latency XWL from the fourth write command XWR4 match each other, the CTRL 114 may provide the fourth read data RD4_DATA of the DRAM chips 112 to the NVM chips 111 via the second internal data lines 204 (S74). The NVM chips 111 may write the received fourth read data RD4_DATA as the fourth write data XWR4_DATA.

Figure 7:
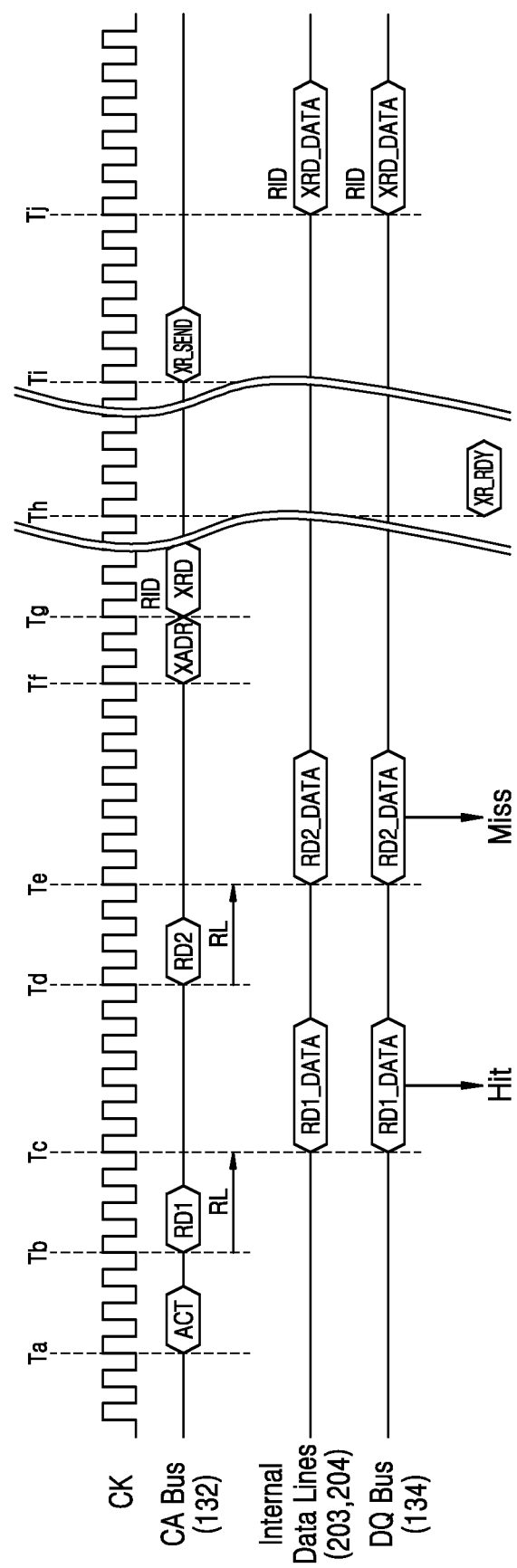
FIG. 7 is a timing diagram illustrating an operation method of the NVDIMMs (110 and 120) in FIG. 2.

FIG. 7 is a timing diagram illustrating an operation method of the NVDIMMs (110 and 120) in FIG. 2. FIG. 6 illustrates a timing diagram in response to the read request from the host 105 to the NVM chips 111.

Referring to FIGS. 2 and 7, the NVDIMM 110 may receive the read request from the host 105 to the NVM chips 111.

At a time point Ta, the host 105 may read a cache area corresponding to the first cache address of the DRAM chips 112 of the data requested to be written to the NVM chips 111. To this end, the CTRL 114 may receive the active command ACT related with the DRAM chips 112 from the host 105 with reference to the first cache address via the CA bus 132.

At a time point Tb, the CTRL 114 may receive the first read command RD1 related with the DRAM chips 112 from the host 105 with reference to the first cache address via the CA bus 132. The DRAM chips 112 may receive the first cache address and the first read command RD1 from the CTRL 114 via the first internal command address lines 201 and perform the read operation in response to the first cache address and the read command RD1.

At a time point Tc, the DRAM chips 112 may output the first read data RD1_DATA after the read latency RL from the first read command RD1 via the first internal data lines 203 and the data buffers 113 to the DQ bus 134. In this case, the CTRL 114 may send the first read data RD1_DATA together with the ECC information including the cache hit signal to the host 105. The host 105 may verify that the first read data RD1_DATA of the DQ bus 134 is the cache hit.

At a time point Td, the CTRL 114 may receive the second read command RD2 related with the DRAM chips 112 from the host 105 with reference to the second cache address via the CA bus 132. The DRAM chips 112 may receive the second cache address and the second read command RD2 from the CTRL 114 via the first internal command address lines 201, and perform the read operation in response to the second cache address and the second read command RD2.

At a time point Te, the DRAM chips 112 may output the second read data RD2_DATA after the read latency RL from the second read command RD2 via the first internal data lines 203 and the data buffers 113 to the DQ bus 134. In this case, the CTRL 114 may send the second read data RD2_DATA together with the ECC information including the cache miss signal to the host 105. The host 105 may verify that the second read data RD2_DATA of the DQ bus 134 is meaningless as the cache miss.

At a time point Tf, the host 105 may verify the cache miss of the DRAM chips 112 and issue a fill request for the data requested to be read to the NVM chips 111. Accordingly, the CTRL 114 may receive the address XADR of data requested to be read from the NVM chips 111 via the CA bus 132. The NVM chips 111 may receive the address XADR from the CTRL 114 via the second internal command address lines 202.

At a time point Tg, the CTRL 114 may receive a third read command XRD related with the NVM chips 111 via the CA bus 132. The third read command XRD may include a read identification (RID) number of the host 105. The host 105 may use the RID number to identify a read command related with the data sent to the host 105. The NVM chips 111 may receive the third read command XRD from the CTRL 114 via the second internal command address lines 202, and perform the read operation in response to the address XADR and the third read command XRD.

At a time point Th, the CTRL 114 may, to store the read data related with the third read command XRD in the NVM buffer 116 and indicate that the CTRL 114 is ready for the third read command XRD to be sent to the host 105, send a read ready signal XR_RDY to the host 105 by toggling or transition of the read ready signal XR_RDY According to an embodiment, the CTRL 114 may send the read ready signal XR_RDY to the host 105 by toggling or transition of the read ready signal XR_RDY indicating that the read data related with the third read command XRD stored in the NVM buffer 116 has been stored in the DRAM chips 112 and that the read data is ready to be sent to the host 105.

At a time point Ti, the host 105 may, to detect the transition of the read ready signal XR_RDY and indicate that the host 105 is ready to receive the read data related with the third read command XRD, send a read send signal XR_SEND to the CTRL 114 by toggling or transition of the read send signal XR_SEND. The read send signal XR_SEND may be sent by the host 105 to the CTRL 114 at any time and regardless of timing parameters. The host 105 may control the traffic on the DQ bus 134 by timing when the read send signal XR_SEND is sent to the CTRL 114.

At the time points Th and Ti, the read ready signal XR_RDY and the read send signal XR_SEND exchanged between the host 105 and the CTRL 114 of the NVDIMM 110 may be sent over pins that are not used in the previous protocol (for example, DDR4). Alternatively, in the current protocol (for example, DDR5), the read ready signal XR_RDY and the read transmission signal XR_SEND may be sent via dedicated pins that are allocated to the read ready signal XR_RDY and the read send signal XR_SEND, respectively.

At a time point Tj, the CTRL 114 may, in response to the read send signal XR_SEND received via the CA bus 132, output the read data XRD_DATA related with the third read command XRD via the second internal data lines 204 and the NVM buffer 116 of the CTRL 114, and may send the XRD_DATA to the host 105. In addition, the RID number may be sent to the host 105 via an RID pin when the read data XRD_DATA is sent to the host 105.

Figure 8:
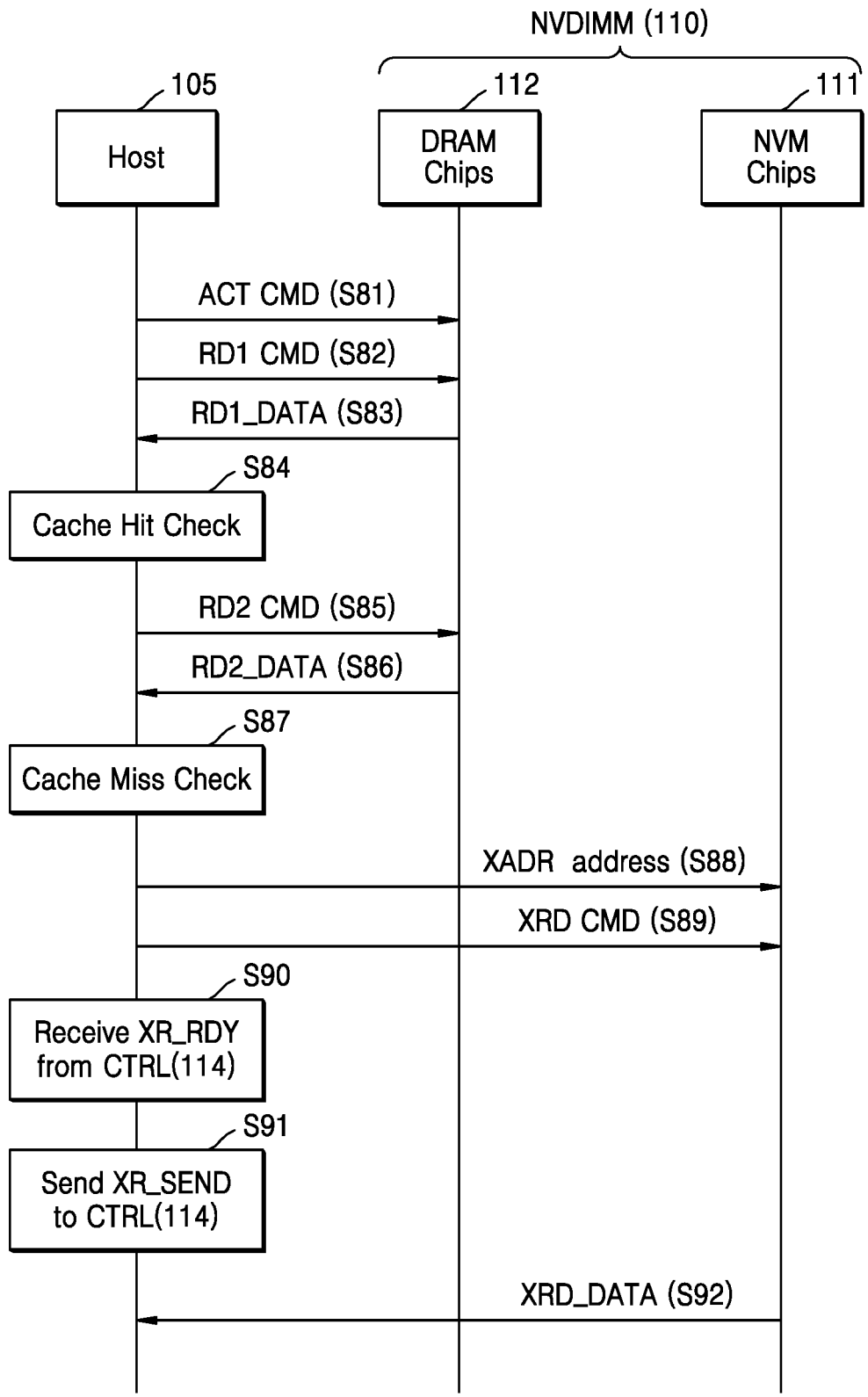
FIG. 8 is a diagram illustrating a process of the NVDIMM, according to the timing diagram of FIG. 7.

FIG. 8 is a diagram illustrating a process of the NVDIMM 110, according to the timing diagram of FIG. 7.

Referring to FIG. 8 in conjunction with FIGS. 2 and 7, the host 105 may issue the write request to the NVM chips 111 of the NVDIMM 110.

The active command ACT may be provided to the DRAM chips 112 from the host 105 (S81). The host 105 may provide the first cache address of the DRAM chips 112 of data requested to be read to the NVM chips 111 to the DRAM chips 112 together with the active command ACT.

The first read command RD1 may be provided to the DRAM chips 112 from the host 105 (S82). The host 105 may provide a first cache address of the DRAM chips 112 to the DRAM chips 112 together with the first read command RD1.

The DRAM chips 112 may perform the read operation in response to the first cache address and the first read command RD1 (S83). The DRAM chips 112 may perform the read operation, and after the read latency RL from the first read command RD1, send the first read data RD1_DATA via the first internal data lines 203, the data buffers 113, and the DQ bus 134.

The host 105 may verify that the first read data RD1_DATA sent via the DQ bus 134 is the cache hit (S84).

The second read command RD2 may be provided to the DRAM chips 112 from the host 105 (S85). The host 105 may provide a second cache address of the DRAM chips 112 to the DRAM chips 112 together with the second read command RD2. The DRAM chips 112 may perform the read operation in response to the second cache address and the second read command RD2.

The DRAM chips 112 may perform the read operation, and after the read latency RL from the second read command RD2, send the second read data RD2_DATA via the first internal data lines 203, the data buffers 113, and the DQ bus 134 to the host 105 (S86).

The host 105 may verify that the second read data RD2_DATA sent via the DQ bus 134 is the cache miss (S87). The host 105 may verify the cache miss of the DRAM chips 112, and issue a fill request for the data requested to be read to the NVM chips 111.

When the host 105 issues the fill request, the address XADR of the data requested to be read to the NVM chips 111 may be provided to the NVM chips 111 from the host 105 (S88).

The third read command XRD may be provided to the NVM chips 111 from the host 105 (S89). The NVM chips 111 may perform the read operation in response to the address XADR and the third read command XRD.

The host 105 may receive from the CTRL 114 the read ready signal XR_RDY indicating that the read data related with the third read command XRD is ready to be sent to the host 105 (S90).

The host 105 may detect the transition of the read ready signal XR_RDY, and send to the CTRL 114 the read send signal XR_SEND indicating that the host 105 is ready to receive the read data related with the third read command XRD (S91).

The NVM chips 111 may send by the CTRL 114 to the host 105 the read data XRD_DATA related with the third read command XRD via the second internal data lines 204, the NVM buffer 116 of the CTRL 114, and the DQ bus 134 (S92). In other words, the NVM chips 111 may send the read data XRD_DATA as the data requested to be read to the host 105.

Figure 9:
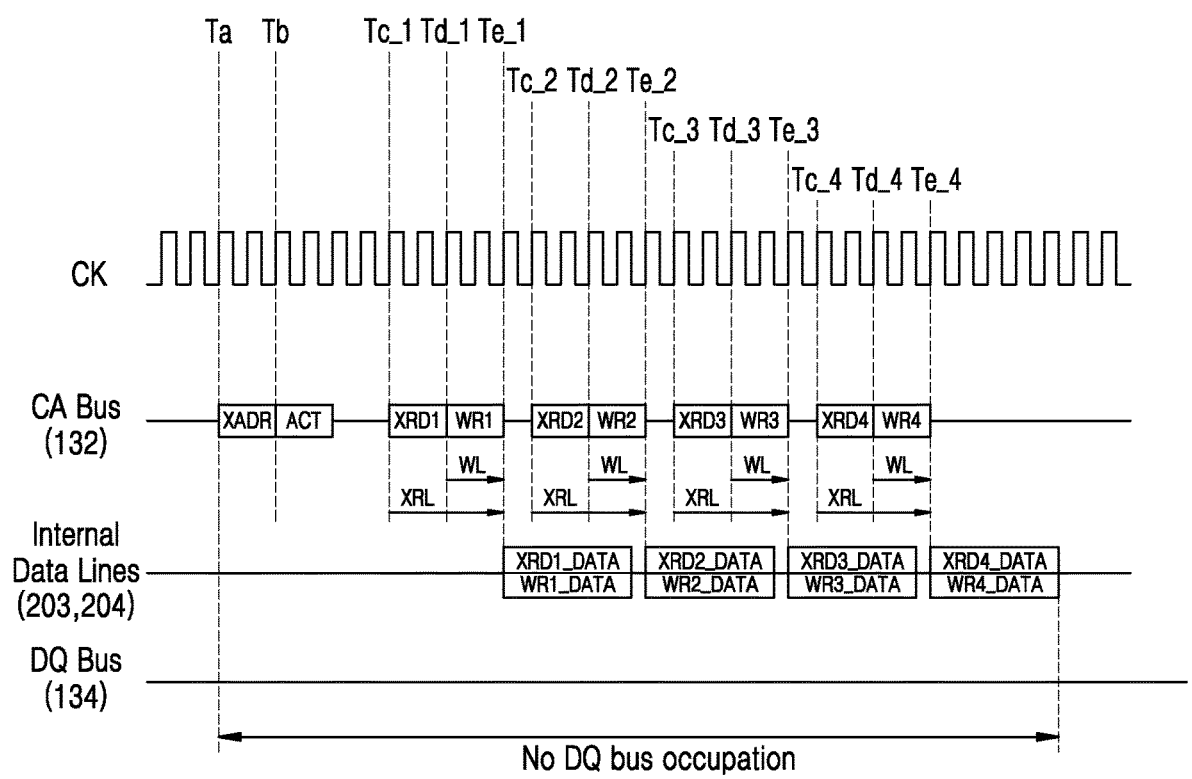
FIG. 9 is a timing diagram illustrating an operation method of the NVDIMMs in FIG. 2.

FIG. 9 is a timing diagram illustrating an operation method of the NVDIMM 110 in FIG. 2. In FIG. 9, the host 105 may request a cache line fill to allow the NVM chips 111 of the NVDIMM 110 to store the data requested to be read from the DRAM chips 112, and the cache line fill operation is illustrated that is performed according to a cache line fill request from the host 105. The cache line fill operation may be performed continuously or in an interleaving manner according to the number of chunks of data sent between the DRAM chips 112 and the NVM chips 111. For example, the write command for DRAM chips 112 may be related with four data chunks in the read request to NVM chips 111. Accordingly, the host 105 may, to perform the cache line fill operation related with four data chunks between the DRAM chips 112 and the NVM chips 111, provide the first through fourth read commands XRD1 through XRD4 to the NVM chips 111 and the first through fourth write commands WR1 through WR4 to the DRAM chips 112.

Referring to FIGS. 2 and 9, the CTRL 114 of the NVDIMM 110 may receive the read request to the NVM chips 111 from the host 105.

At the time point Ta, the CTRL 114 may receive the address XADR of data requested to be read to the NVM chips 111 via the CA bus 132. The NVM chips 111 may receive the address XADR from the CTRL 114 via the second internal command address lines 202. In this case, the second chip select signal CS1 line among the second internal command address lines 202 may be provided in an activated state to the NVM chips 111.

At the time point Tb, the CTRL 114 may, to store the cache area corresponding to the cache address of the DRAM chips 112 of the data requested to be read to the NVM chips 111, receive the active command ACT related with the DRAM chips 112 by referring to the cache address via the CA bus 132. The DRAM chips 112 may receive the cache address and the active command ACT from the CTRL 114 via the first internal command address lines 201, and perform a row active operation in response to the cache address and the active command ACT. In this case, the first chip select signal CS0 line among the first internal command address lines 201 may be provided in an activated state to the DRAM chips 112.

At a time point Tc_1, the CTRL 114 may receive the first read command XRD1 related with the NVM chips 111 via the CA bus 132. The NVM chips 111 may receive the first read command XRD1 from the CTRL 114 via the second internal command address lines 202, and perform the read operation in response to the address XADR and the first read command XRD1. The NVM chips 111 may perform the read operation after the read latency XRL from the first read command XRD1. The first read data XRD1_DATA output from the NVM chips 111 may be loaded on the first internal data lines 203 via the second internal data lines 204 and the NVM buffer 116 of the CTRL 114. In this case, the CTRL 114 may control the first read data XRD1_DATA on the first internal data lines 203 not to be provided to the DQ bus 134 via the data buffers 113.

At a time point Td_1, the CTRL 114 may receive the first write command WR1 related with the DRAM chips 112 with reference to the cache address via the CA bus 132. The first write command WR1 may be applied by the first read command XRD1 before an operation of outputting the first read data XRD1_DATA of the NVM chips 111 to the first internal data lines 203 is completed. The DRAM chips 112 may receive the cache address and the first write command WR1 from the CTRL 114 via the first internal command address lines 201, and perform the write operation in response to the cache address and the first write command WR1. The DRAM chips 112 may perform the write operation after the write latency WL from the first write command WR1.

At a time point Te_1, the CTRL 114 may configure the first read data XRD1_DATA output from the NVM chips 111 on the first internal data lines 203 as the first data chunk, configure the first read data XRD1_DATA as the first write data WR1_DATA, and provide the first write data WR1_DATA to the DRAM chips 112. In other words, the CTRL 114 may fill the DRAM chips 112 with the first read data XRD1_DATA of the NVM chips 111 as the first write data WR1_DATA. The DRAM chips 112 may write the first write data WR1_DATA to the memory cells related with the cache address of the data requested to be read.

At a time point Tc_2, the CTRL 114 may receive a second read command XRD2 related with the NVM chips 111 via the CA bus 132. The NVM chips 111 may receive the second read command XRD2 from the CTRL 114 via the second internal command address lines 202, and perform the read operation in response to the address XADR and the second read command XRD2. The NVM chips 111 may perform the read operation after the read latency XRL from the second read command XRD2. The second read data XRD2_DATA output from the NVM chips 111 may be loaded on the first internal data lines 203 via the second internal data lines 204 and the NVM buffer 116 of the CTRL 114. In this case, the CTRL 114 may control the second read data XRD2_DATA on the first internal data lines 203 not to be provided to the DQ bus 134 via the data buffers 113.

At a time point Td_2, the CTRL 114 may receive the second write command WR2 related with the DRAM chips 112 with reference to the cache address via the CA bus 132. The second write command WR2 may be applied by the second read command XRD2 before an operation of outputting the first read data XRD1_DATA of the NVM chips 111 to the first internal data lines 203 is completed. The DRAM chips 112 may receive the cache address and the second write command WR2 from the CTRL 114 via the first internal command address lines 201, and perform the write operation in response to the cache address and the second write command WR2. The DRAM chips 112 may perform the write operation after the write latency WL from the second write command WR2.

At a time point Te_2, the CTRL 114 may configure the second read data XRD2_DATA output from the NVM chips 111 on the first internal data lines 203 as the second data chunk, configure the second read data XRD2_DATA as the second write data WR2_DATA and provide the second write data WR2_DATA to the DRAM chips 112. In other words, the CTRL 114 may fill the DRAM chips 112 with the second read data XRD2_DATA of the NVM chips 111 as the second write data WR2_DATA. The DRAM chips 112 may write the second write data WR2_DATA to the memory cells related with the cache address of the data requested to be read.

At a time point Tc_3, the CTRL 114 may receive the third read command XRD3 related with the NVM chips 111 via the CA bus 132. The NVM chips 111 may receive the third read command XRD3 from the CTRL 114 via the second internal command address lines 202, and perform the read operation in response to the address XADR and the third read command XRD3. The NVM chips 111 may perform the read operation after the read latency XRL from the third read command XRD3. The third read data XRD3_DATA output from the NVM chips 111 may be loaded on the first internal data lines 203 via the second internal data lines 204 and the NVM buffer 116 of the CTRL 114. In this case, the CTRL 114 may control the third read data XRD3_DATA on the first internal data lines 203 not to be provided to the DQ bus 134 via the data buffers 113.

At a time point Td_3, the CTRL 114 may receive the third write command WR3 related with the DRAM chips 112 with reference to the cache address via the CA bus 132. The third write command WR3 may be applied by the third read command XRD3 before an operation of outputting the first read data XRD1_DATA of the NVM chips 111 to the first internal data lines 203 is completed. The DRAM chips 112 may receive the cache address and the third write command WR3 from the CTRL 114 via the first internal command address lines 201, and perform the write operation in response to the cache address and the third write command WR3. The DRAM chips 112 may perform the write operation after the write latency WL from the third write command WR3.

At a time point Te_3, the CTRL 114 may configure the third read data XRD3_DATA output from the NVM chips 111 on the first internal data lines 203 as the third data chunk, configure the third read data XRD3_DATA as the third write data WR3_DATA, and provide the third write data WR3_DATA to the DRAM chips 112. In other words, the CTRL 114 may fill the DRAM chips 112 with the third read data XRD3_DATA of the NVM chips 111 as the third write data WR3_DATA. The DRAM chips 112 may write the third write data WR3_DATA to the memory cells related with the cache address of the data requested to be read.

At a time point Tc_4, the CTRL 114 may receive the fourth read command XRD4 related with the NVM chips 111 via the CA bus 132. The NVM chips 111 may receive the fourth read command XRD4 from the CTRL 114 via the second internal command address lines 202, and perform the read operation in response to the address XADR and the fourth read command XRD4. The NVM chips 111 may perform the read operation after the read latency XRL from the fourth read command XRD4. The fourth read data XRD4_DATA output from the NVM chips 111 may be loaded on the first internal data lines 203 via the second internal data lines 204 and the NVM buffer 116 of the CTRL 114. In this case, the CTRL 114 may control the fourth read data XRD4_DATA on the first internal data lines 203 not to be provided to the DQ bus 134 via the data buffers 113.

At a time point Td_4, the CTRL 114 may receive the fourth write command WR4 related with the DRAM chips 112 with reference to the cache address via the CA bus 132. The fourth write command WR4 may be applied by the fourth read command XRD4 before an operation of outputting the fourth read data XRD4_DATA of the NVM chips 111 to the first internal data lines 203 is completed. The DRAM chips 112 may receive the cache address and the fourth write command WR4 from the CTRL 114 via the first internal command address lines 201, and perform the write operation in response to the cache address and the fourth write command WR4. The DRAM chips 112 may perform the write operation after the write latency WL from the fourth write command WR4.

At a time point Te_4, the CTRL 114 may configure the fourth read data XRD4_DATA output from the NVM chips 111 on the first internal data lines 203 as the third data chunk, configure the fourth read data XRD4_DATA as the fourth write data WR4_DATA, and provide the fourth write data WR4_DATA to the DRAM chips 112. In other words, the CTRL 114 may fill the DRAM chips 112 with the fourth read data XRD4_DATA of the NVM chips 111 as the fourth write data WR4_DATA. The DRAM chips 112 may write the fourth write data WR4_DATA to the memory cells related with the cache address of the data requested to be read.

As described above, in a cache line fill operation that is performed in an interleaving manner between DRAM chips 112 and NVM chips 111, and is related with the read request from host 105 to the NVM chips 111 of NVDIMM 110, DQ bus 134 may not load any data DQ related with the cache line fill operation. The host 105 may perform a data transaction operation with other device(s) connected to the DQ bus 134, during an interval in which no data DQ related with the cache line fill operation of the NVDIMM 110 is loaded on the DQ bus 134. Accordingly, the DQ bus 134 may be efficiently utilized even in the cache line fill operation of the NVDIMM 110.

Figure 10:
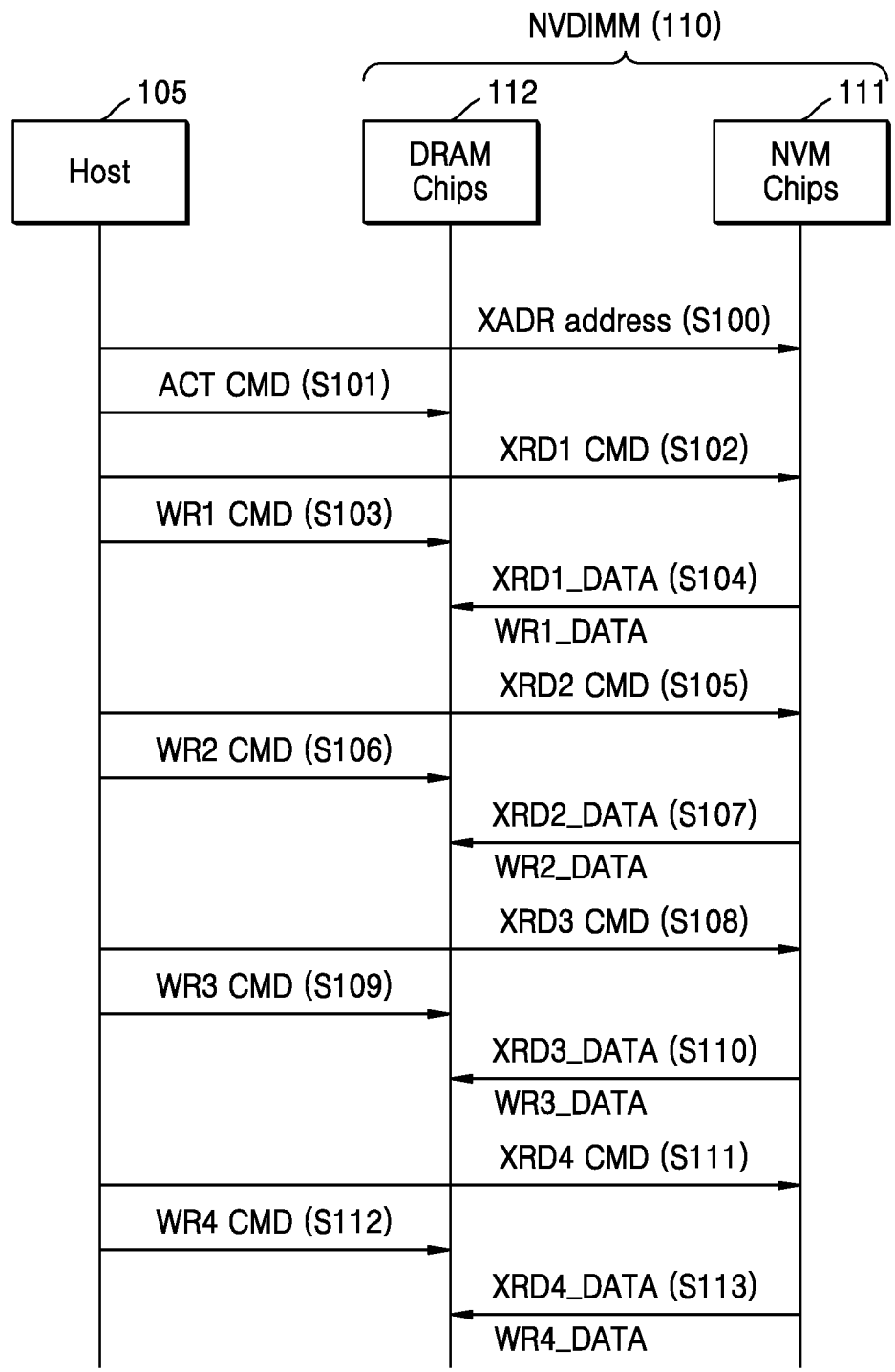
FIG. 10 is a diagram illustrating a process of the NVDIMM, according to the timing diagram of FIG. 9.

FIG. 10 is a diagram illustrating a process of the NVDIMM 110, according to the timing diagram of FIG. 9.

Referring to FIG. 10 in conjunction with FIGS. 2 and 9, the NVDIMM 110 may perform the interleaving cache line fill operation between the DRAM chips 112 related with the read request from the host 105 to the NVM chips 111 and the NVM chips 111.

The address XADR of the data requested to be read from the NVM chips 111 may be provided from the host 105 to the NVM chips 111 (S100).

The active command ACT may be provided from the host 105 to the DRAM chips 112 (S101). The host 105 may provide the cache addresses of the DRAM chips 112 of data requested to be read from the NVM chips 111 to the DRAM chips 112 together with the active command ACT.

The first read command XRD1 may be provided from the host 105 to the NVM chips 111 (S102). The NVM chips 111 may perform the read operation in response to the address XADR and the first read command XRD1. The DRAM chips 112 may perform the read operation, and after the read latency XRL from the first read command XRD1, and send the first read data XRD1_DATA to the first internal data lines 203 via the second internal data lines 204 and NVM buffer 116 of the CTRL 114.

The first write command WR1 may be provided from the host 105 to the DRAM chips 112 (S103). The host 105 may provide the first cache address of the DRAM chips 112 to the DRAM chips 112 together with the first write command WR1. The DRAM chips 112 may perform the write operation in response to the first cache address and the first write command WR1. The DRAM chips 112 may perform the write operation after the write latency WL from the first write command WR1.

When a time point at which the NVM chips 111 outputs the first read data XRD1_DATA after the read latency XRL from the first read command XRD1 to the first internal data lines 203 via the second internal data lines 204 and the NVM buffer 116 of the CTRL 114 and a time point at which the DRAM chips 112 performs the write operation after the write latency WL from the first write command WR1 match each other, the first read data XRD1_DATA of the NVM chips 11 may be provided to the DRAM chips 112 via the first internal data lines 203 (S104). The DRAM chips 112 may write the received first read data XRD1_DATA as the first write data WR1_DATA.

The second read command XRD2 may be provided from the host 105 to the NVM chips 111 (S105). The NVM chips 111 may perform the read operation in response to the address XADR and the second read command XRD2. The NVM chips 111 may perform the read operation, and after the read latency XRL from the second read command XRD2, send the second read data XR2_DATA to the first internal data lines 203 via the second internal data lines 204 and the NVM buffer 116 of the CTRL 114.

The second write command WR2 may be provided from the host 105 to the DRAM chips 112 (S106). The host 105 may provide the second cache address of the DRAM chips 112 to the DRAM chips 112 together with the second write command WR2. The DRAM chips 112 may perform the write operation in response to the second cache address and the second write command WR2. The DRAM chips 112 may perform the write operation after the write latency WL from the second write command WR2.

When a time point at which the NVM chips 111 outputs the second read data XRD2_DATA after the read latency XRL from the second read command XRD2 to the first internal data lines 203 via the second internal data lines 204 and the NVM buffer 116 of the CTRL 114 and a time point at which the DRAM chips 112 performs the write operation after the write latency WL from the second write command WR2 match each other, the second read data XRD2_DATA of the NVM chips 11 may be provided to the DRAM chips 112 via the first internal data lines 203 (S107). The DRAM chips 112 may write the received second read data XRD2_DATA as the second write data WR2_DATA.

The third read command XRD3 may be provided from the host 105 to the NVM chips 111 (S108). The NVM chips 111 may perform the read operation in response to the address XADR and the third read command XRD3. The NVM chips 111 may perform the read operation, and after the read latency XRL from the third read command XRD3, send the third read data XR3_DATA to the first internal data lines 203 via the second internal data lines 204 and the NVM buffer 116 of the CTRL 114.

The third write command WR3 may be provided from the host 105 to the DRAM chips 112 (S109). The host 105 may provide the third cache address of the DRAM chips 112 to the DRAM chips 112 together with the third write command WR3. The DRAM chips 112 may perform the write operation in response to the third cache address and the third write command WR3. The DRAM chips 112 may perform the write operation after the write latency WL from the third write command WR3.

When a time point at which the NVM chips 111 outputs the third read data XRD3_DATA after the read latency XRL from the third read command XRD3 to the first internal data lines 203 via the second internal data lines 204 and the NVM buffer 116 of the CTRL 114 and a time point at which the DRAM chips 112 performs the write operation after the write latency WL from the third write command WR3 match each other, the third read data XRD3_DATA of the NVM chips 11 may be provided to the DRAM chips 112 via the first internal data lines 203 (S110). The DRAM chips 112 may write the received third read data XRD3_DATA as the third write data WR3_DATA.

The fourth read command XRD4 may be provided from the host 105 to the NVM chips 111 (S110). The NVM chips 111 may perform the read operation in response to the address XADR and the fourth read command XRD4 (S111). The NVM chips 111 may perform the read operation, and after the read latency XRL from the fourth read command XRD4, send the fourth read data XRD4_DATA to the first internal data lines 203 via the second internal data lines 204 and the NVM buffer 116 of the CTRL 114.

The fourth write command WR4 may be provided from the host 105 to the DRAM chips 112 (S112). The host 105 may provide the fourth cache address of the DRAM chips 112 to the DRAM chips 112 together with the fourth write command WR4. The DRAM chips 112 may perform the write operation in response to the fourth cache address and the fourth write command WR4. The DRAM chips 112 may perform the write operation after the write latency WL from the fourth write command WR4.

When a time point at which the NVM chips 111 outputs the fourth read data XRD4_DATA after the read latency XRL from the fourth read command XRD4 to the first internal data lines 203 via the second internal data lines 204 and the NVM buffer 116 of the CTRL 114 and a time point at which the DRAM chips 112 performs the write operation after the write latency WL from the fourth write command WR4 match each other, the fourth read data XRD4_DATA of the NVM chips 11 may be provided to the DRAM chips 112 via the first internal data lines 203 (S113). The DRAM chips 112 may write the received fourth read data XRD4_DATA as the fourth write data WR4_DATA.

Figure 11:
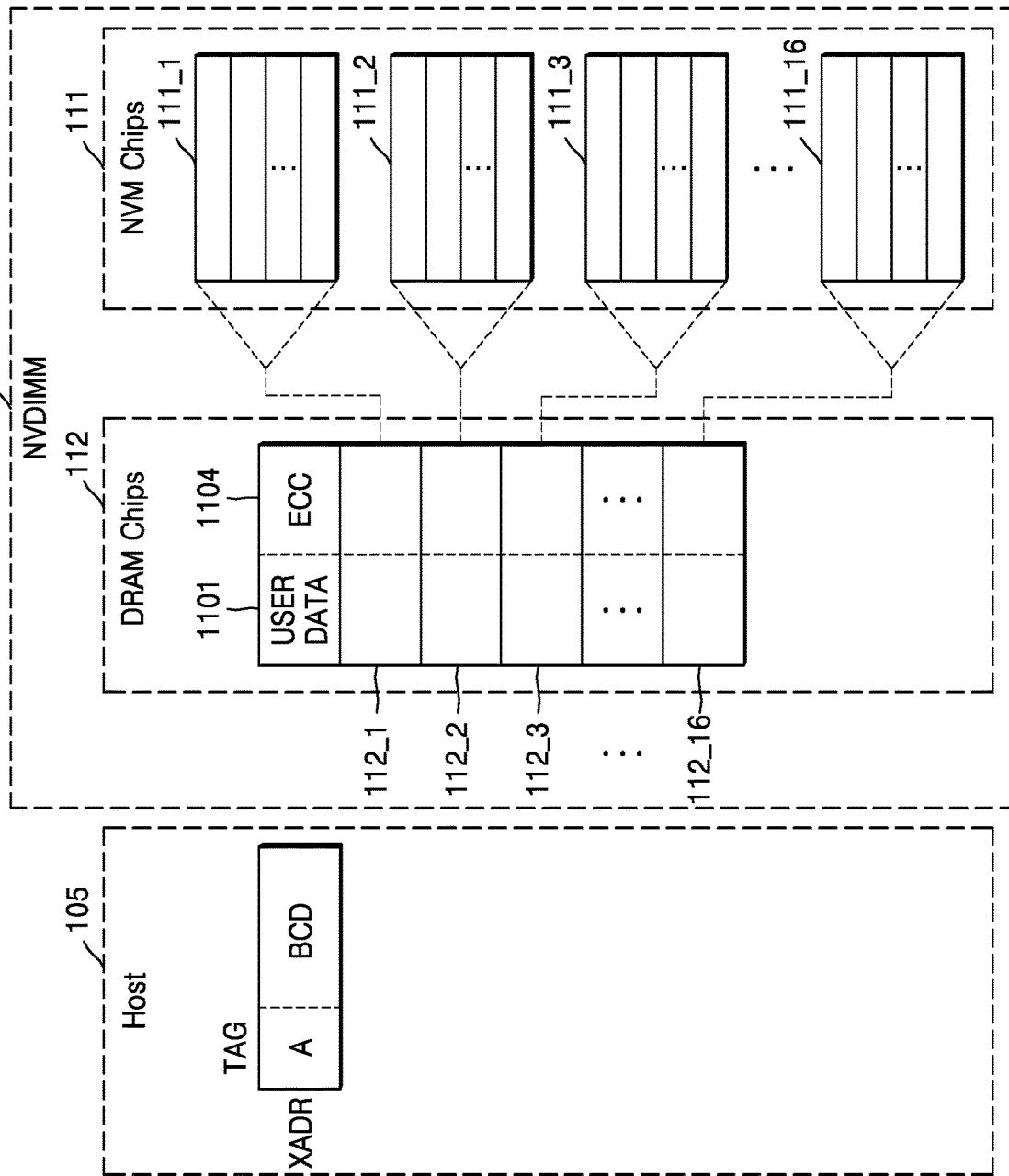
FIGS. 11 and 12 are diagrams of address structures of an NVDIMM, according to example embodiments.
Figure 12:
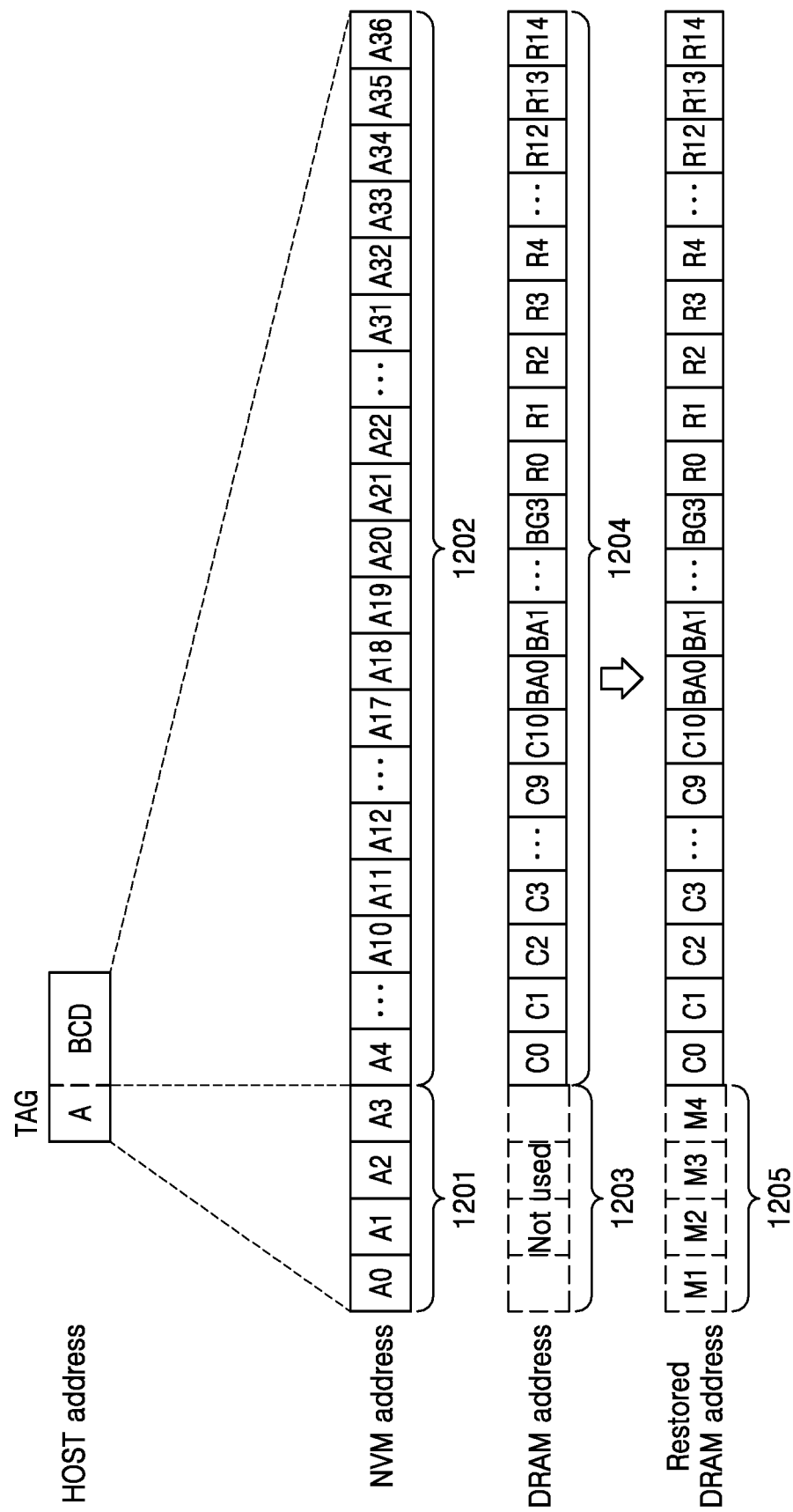

FIGS. 11 and 12 are diagrams of address structures of the NVDIMM 110, according to example embodiments. In FIG. 11, it is assumed that a cache line size of the DRAM chips 11, the DRAM chips 112 is about 64 bytes, the DRAM chips 112 are implemented with about 1 giga-bytes (GB), and the NVM chips 111 are implemented with about 16 GB.

Referring to FIGS. 2 and 11, to support the cache mode of the DRAM chips 112, an about 1:16 correspondence structure may be represented by a ratio of about 1 GB of the DRAM chips 112 and about 16 GB of the NVM chips 111. The NVM chips 111 may be divided into sixteen areas (111_1, 111_2, 111_3, . . . 111_16), and the sixteen areas (111_1 through 111_16) may be addressed by tag information of four bits.

The host 105 may, at the time of requesting a write to the NVM chips 111, send the address XADR of the data requested to be written to the NVM chips 111 to the NVDIMM 110 via the CA bus 132. For example, a data write request may occur in an area corresponding to 'ABCD' of the address XADR of the NVM chips 111 in the host 105. An address 'A' of the 'ABCD' of the address XADR of the NVM chips 111 may indicate tag information in cache lines (112_1, 112_2, 112_3, . . . , 112_16) of the DRAM chips 112.

The host 105 may verify whether the data requested to be written is cached in the DRAM chips 112. The host 105 may, to verify whether the DRAM chips 112 have the cache hit, send to the DRAM chips 112 a read request for the cache line corresponding to an address 'BCD' among the cache lines (112_1, 112_2, 112_3, . . . , 112_16) of the DRAM chips 112.

The DRAM chips 112 may output data of the cache line (for example, 112_1) for the address 'BCD' provided from the host 105. The cache line 112_1 corresponding to the address 'BCD' may include user data 1101 and ECC information 1104 stored in the cache line 112_1. The ECC information 1104 may include parity information used to detect and correct errors that may occur in the user data 1101 written to or read from the corresponding cache lines (112_1, 112_2, 112_3, . . . , 112_16). In addition, the ECC information 1104 may include parity information used to detect and correct errors that may occur at addresses accessed by the DRAM chips 112.

Referring to FIG. 12, the address 'ABCD' of the address XADR of data requested to be written/read to/from the NVM chips 111 provided from the host 105 may include address bits 1201 corresponding to the address 'A' and address bits 1202 corresponding to the address 'BCD'. According to determination of the cache miss/cache hit for the cache lines (112_1, 112_2, 112_3, . . . , 112_16) of the DRAM chips 112, the address bits corresponding to the address 'A' and the address bits 1202 corresponding to the address 'BCD' provided to the NVM chips 111 may be provided to the NVM chips 111 via the CA bus 132.

However, to verify a cache state such as the cache miss and the cache hit of the DRAM chips 112, when the read request for the cache lines (112_1, 112_2, 112_3, . . . , 112_16) from the host 105 is sent to the DRAM chips 112, only cache address bits 1204 corresponding to the address 'BCD' may be provided, while the address bits 1201 corresponding to the address 'A' may not be provided (1203). The cache address bits 1204 corresponding to the address 'BCD' may be referred to as the cache address of data requested to be written to the NVM chips 111. In this case, the CTRL 114 of the NVDIMM 110 may load only the cache address bits 1204 corresponding to the address 'BCD' on the CA bus 132, and may be aware of that the address bits 1201 corresponding to the address 'A', that is the tag information, is not loaded.

The ECC information 1104 of each of the cache lines (112_1, 112_2, 112_3, . . . , and 112_16) may include parity information (P0 through P3) for the address bits (1201 and 1202), or A0 through A36, as described below.

$$P0 = XOR\{A0, A4, A8, A12, \ldots, A32, A36\}$$

$$P1 = XOR\{A1, A5, A9, A13, \ldots, A33\}$$

$$P2 = XOR\{A2, A6, A10, A14, \ldots, A34\}$$

$$P3 = XOR\{A3, A7, A11, A15, \ldots, A35\}$$

The parity information P0 through P3 may be provided by using an exclusive OR function for a group of address bits A0 through A36 (A0, A1, A2, A3, A4 . . . A10, A11, A12, . . . A17, A18, A19, A20, A21, A22, . . . , A31, A32, Ad33, A34, A35 and A36).

The CTRL 114 of the NVDIMM 110 may be aware of a mapping relationship between the address 'BCD' corresponding to the cache address bits 1204 (C0, C1, C2 C3, . . . C9, C10, BA0, BA1, . . . , BG3, R0, R1, R2, R3, R4, . . . R12, R13 and R14) and A4 through A26 of the address bits 1202. Accordingly, the CTRL 114 of the NVDIMM 110 may be configured to restore the address 'A', that is the tag information, by using the parity bits P0 through P3 provided as the ECC information 1104 and A4 through A26 of the address bits 1202 corresponding to the cache address bits 1204.

The CTRL 114 may restore the address 'A', when the address 'A' of the data requested to be written is missing, or as a preparation for the case when an error in the address 'A' of the data requested to be written occurs. The tag information 1205 restored by the CTRL 114 may be configured with four bits (M1, M2, M3, and M4). The CTRL 114 may store the restored tag information 1205 and the cache address bits 1204 as DRAM addresses. Thereafter, the CTRL 114 may, as illustrated in FIG. 3, output the read data RD_DATA from the DRAM chips 112 to the internal data lines 203 with reference to the restored tag information 1205 and the cache address bits 1204, and may flush such that the read data RD_DATA is written as the write data XWR_DATA to the NVM chips 111.

In this manner, the CTRL 114 may restore the address 'A', that is the tag information, even for the 'ABCD' of the address XADR of the data requested to be read to the NVM chips 111 provided from the host 105. The CTRL 114 may restore the address 'A', that is the tag information, by using the A4 through A26 of the address bits 1202 corresponding to the cache address bits 1204 of the data requested to be read to the NVM chips 111 and the address parity bits provided to the ECC information 1104. The CTRL 114 may, as illustrated in FIG. 12, output the first read data (for example, XRD1_DATA) from the NVM chips 111 to the internal data lines 203 with reference to the restored tag information 1205 and the cache address bits 1204, and may flush such that the first read data XRD1_DATA is written as the first write data (for example, WR1_DATA) to the DRAM chips 112.

In the above-described embodiments, a process in which the DRAM chip 112 of the NVDIMM 110 operates as a cache memory of the NVM chip 111 has been described. For example, it has been described that, in the cache operation of the NVDIMM 110, the read data according to the read latency RL of the DRAM chip 112 and the write data according to the write latency XWL of the NVM chip 111 are configured to match each other on the first and second internal data lines 203 and 204, or the read data according to the read latency XRL of the NVM chip 111 and the write data according to the write latency WL of the DRAM chip 112 are configured to match each other on the first and second data lines 203 and 204. However, an operation in which the data according to the read/write RL/WL latencies of the DRAM chip 112 and the data according to the write/read XWL/XRL latencies of the NVM chip 111 match each other in the internal data lines may be applied to data movement operations between the NVM chips 111 and the DRAM chips 112.

Figure 13:
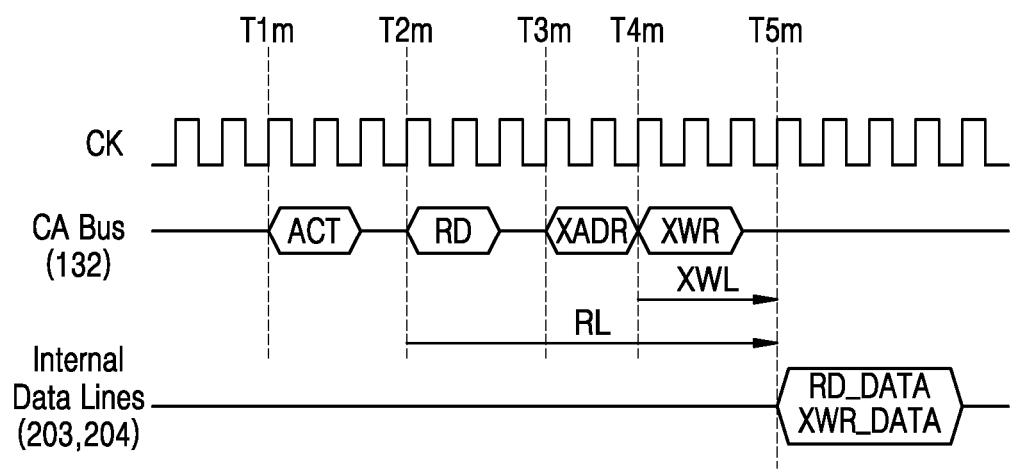
FIGS. 13 and 14 are timing diagrams for describing a data movement operation of the NVDIMM in FIG. 2.
Figure 14:
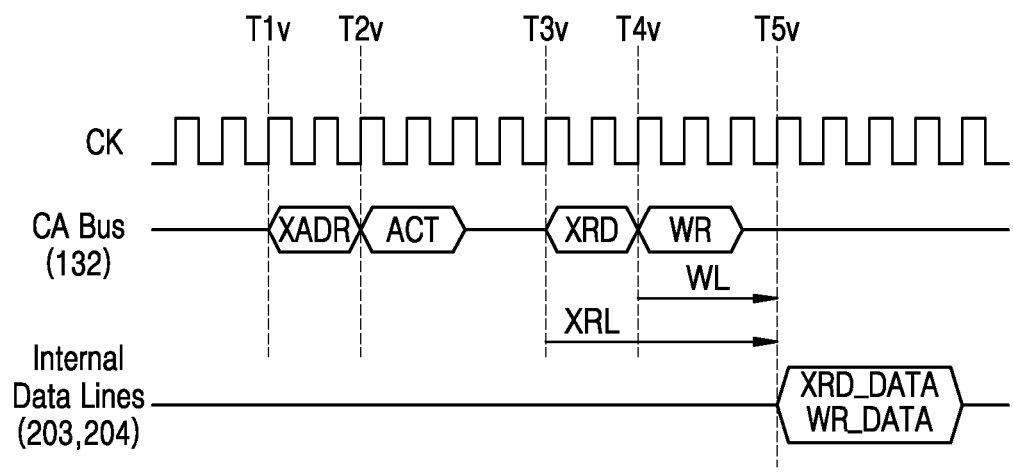

FIGS. 13 and 14 are timing diagrams for describing a data movement operation of the NVDIMM 110 in FIG. 2. FIG. 13 is a timing diagram of data movement from the DRAM chip 112 to the NVM chip 111. FIG. 14 is a timing diagram of data movement from the NVM chip 111 to the DRAM chip 112.

Referring to FIG. 13, the NVDIMM 110 may receive a data movement request from the DRAM chip 112 to the NVM chip 111, from the host 105.

At a time point T1*m*, the CTRL 114 may receive a row address and the active command ACT of the DRAM chip 112 for which the data movement is requested via the CA bus 132. The DRAM chip 112 may receive the row address and the active command ACT from the CTRL 114 via the first internal command address lines 201, and perform the row active operation in response to the row address and the active command ACT.

At a time point T2*m*, the CTRL 114 may receive a column address and the active command ACT of the DRAM chip 112 for which the data movement is requested via the CA bus 132. The DRAM chip 112 may receive the column address and the read command RD from the CTRL 114 via the first internal command address lines 201, and perform the read operation in response to the column address and the read command RD. The DRAM chip 112 may perform the read operation and output read data RD_DATA after the read latency RL from the time point when the read command RD has been received. The read data RD_DATA output from the DRAM chip 112 may be output to the first internal data lines 203 of the NVDIMM 110. In this case, the CTRL 114 may control the read data RD_DATA of the DRAM chips 112 on the first internal data lines 203 not to be provided to the DQ bus 134 via the data buffers 113.

At a time point T3*m*, the CTRL 114 may receive the address XADR of the NVM chip 111 to which the read data RD_DATA of the DRAM chip 112 read upon a request of data movement via the CA bus 132 is to be written. The NVM chip 111 may receive the address XADR from the CTRL 114 via the second internal command address lines 202.

At a time point T4*m*, the CTRL 114 may receive the write command XWR of the NVM chip 111 related with the address XADR via the CA bus 132. The write command XWR may be applied by the read command RD before an operation of outputting the read data RD_DATA of the DRAM chip 112 to the first internal data lines 203 is completed. The NVM chip 111 may receive the write command XWR from the CTRL 114 via the second internal command address lines 202, and perform a write operation in response to the address XADR and the write command XWR. The NVM chips 111 may perform the write operation after the write latency XWL from the write command XWR.

At a time point T5m, the CTRL 114 may perform the data movement operation such that the read data RD_DATA of the DRAM chips 112 are written to the NVM chips 111. The CTRL 114 may, when a time point when the DRAM chip 112 outputs the read data RD_DATA to the internal data lines 203 after the read latency RL from the read command RD and a time point when the NVM chip 111 performs the write operation after the write latency XWL from the write command XWR coincide with each other, configure the read data RD_DATA of the DRAM chip 112 loaded on the internal data lines 203 as the write data XWR_DATA, and provide the write data XWR_DATA to the NVM chip 111. The NVM chip 111 may write the write data XWR_DATA to the memory cells corresponding to the address XADR.

Referring to FIG. 14, the NVDIMM 110 may receive the data movement request from the NVM chip 111 to the DRAM chip 112, from the host 105.

At a time point T1v, the CTRL 114 may receive an address XADR of data requested to be moved to the NVM chips 111 via the CA bus 132. The NVM chips 111 may receive the address XADR from the CTRL 114 via the second internal command address lines 202.

At a time point T2v, the CTRL 114 may, to store the data requested to be moved from the NVM chips 111 to the DRAM chips 112, receive the row address and the active command ACT related with the DRAM chips 112 via the CA bus 132. The DRAM chips 112 may receive the row address and the active command ACT from the CTRL 114 via the first internal command address lines 201, and perform the row active operation in response to the row address and the active command ACT.

At a time point T3v, the CTRL 114 may receive the read command XRD related with the NVM chips 111 via the CA bus 132. The NVM chip 111 may receive the read command XRD from the CTRL 114 via the second internal command address lines 202, and perform the read operation in response to the address XADR and the read command XRD. The NVM chip 111 may perform the read operation after the read latency XRL from the read command XRD. The read data XRD_DATA output from the NVM chips 111 may be output to the first internal data lines 203 via the second internal data lines 204 and the NVM buffer 116 of the CTRL 114. The NVM buffer 116 may store the read data XRD_DATA output from the NVM chip 111, and then send the read ready signal XR_RDY to the CTRL 114 indicating that the read data XRD_DATA is ready to be sent to the DRAM chip 112. In this case, the CTRL 114 may control the read data XRD_DATA of the NVM chips 111 on the first internal data lines 203 not to be provided to the DQ bus 134 via the data buffers 113.

At a time point T4v, the CTRL 114 may receive the write command WR with reference to the column address related with the DRAM chips 112 via the CA bus 132. The write command WR may be applied by the read command XRD before an operation of outputting the read data XRD_DATA of the NVM chips 111 to the first internal data lines 203 is completed. The DRAM chip 112 may receive the column address and the write command WR from the CTRL 114 via the first internal command address lines 201, and perform the write operation in response to the column address and the write command WR. The DRAM chip 112 may perform the write operation after the write latency WL from the write command WR.

At a time point T5v, the CTRL 114 may perform the data movement operation such that the read data XRD_DATA of the NVM chip 111 is written to the DRAM chip 112. The CTRL 114 may, when a time point when the NVM chip 111 outputs the read data XRD_DATA to the internal data lines 203 after the read latency XRL from the read command XRD and a time point when the DRAM chip 112 performs the write operation after the write latency WL from the write command WR coincide with each other, configure the read data XRD_DATA of the NVM chip 111 loaded on the internal data lines 203 as the write data WR_DATA, and provide the write data XWR_DATA to the DRAM chip 112. The DRAM chip 112 may write the write data WR_DATA to the memory cells corresponding to the row address and the column address.

While example embodiments have been particularly shown and described, it will be understood that various changes in form and details may be made therein without departing from the spirit and scope of the following claims.

What is claimed is:

1. An operation method of a memory module comprising a non-volatile memory chip, a volatile memory chip, and a controller configured to control the volatile memory chip and the non-volatile memory chip such that the volatile memory chip operates as a cache memory of the non-volatile memory chip, the operation method comprising:
    receiving, by the controller, a write request from a host to the non-volatile memory chip;
    sending, by the controller, a first read command to the volatile memory chip with reference to a cache address of first data requested to be written to the non-volatile memory chip;
    sending, by the controller, a first write command to the non-volatile memory chip with reference to second data requested to be written; and
    configuring, by the controller, the first data output from the volatile memory chip in response to the first read command as second data, and controlling the second data to be written to the non-volatile memory chip,
    wherein the first write command is applied before the first data is output to first internal data lines by the first read command after the first read command is applied, and at a time point when a read latency of the first read command and a write latency of the first write command coincide with each other whereby the time point occurs after the read latency of the first read command and the write latency of the first write command elapse, the second data is written to the non-volatile memory chip.

2. The operation method of claim 1, wherein the applying of the first write command before an operation of the first data being output to the first internal data lines by the first read command is completed.

3. The operation method of claim 1, further comprising, before sending the first read command to the volatile memory chip, sending, by the controller, an active command directed to the volatile memory chip with reference to the cache address.

4. The operation method of claim 1, further comprising, before sending the first write command to the non-volatile memory chip, sending, by the controller, a non-volatile memory address of the second data requested to be written to the non-volatile memory chip.

5. The operation method of claim 1, further comprising:
    sending, by the controller, a second read command to the volatile memory chip with reference to the cache address;

sending, by the controller, a second write command to the non-volatile memory chip with reference to the second data requested to be written; and configuring, by the controller, first data output from the volatile memory chip in response to the second read command as a second data related with the second write command, and controlling the second data to be written to the non-volatile memory chip, wherein the second write command is applied before the first data is output to the first internal data lines of the memory module by the second read command after the second read command is applied, and at a time point when a read latency of the first read command and a write latency of the first write command coincide with each other whereby the time point occurs after the read latency of the first read command and the write latency of the first write command elapse, the second data is written to the non-volatile memory chip.

6. The operation method of claim 1, further comprising:
receiving, by the controller, a non-volatile memory address of data requested to be written to the non-volatile memory chip and parity information of the non-volatile memory address;
restoring, by the controller, tag information indicating cache mapping between the non-volatile memory chip and the volatile memory chip by using the parity information of the non-volatile memory address; and
writing, by the controller, the second data to the non-volatile memory chip by using the cache address and the tag information.

7. An operation method of a memory module comprising a non-volatile memory chip, a volatile memory chip, and a controller configured to control the volatile memory chip and the non-volatile memory chip such that the volatile memory chip operates as a cache memory of the non-volatile memory chip, the operation method comprising:
receiving, by the controller, a read request from a host to the non-volatile memory chip;
sending, by the controller, a first read command to the non-volatile memory chip with reference to a cache address of data requested to be read from the non-volatile memory chip;
sending, by the controller, a first write command to the volatile memory chip with reference to the first data requested to be read; and
configuring, by the controller, second data output from the non-volatile memory chip in response to the first read command as first data related with the first write command, and controlling the first data to be written to the volatile memory chip,
wherein the first write command is applied before the second data is output to second internal data lines of the memory module by the first read command after the first read command is applied, and
at a time point when a read latency of the first read command and a write latency of the first write command coincide with each other whereby the time point occurs after the read latency of the first read command and the write latency of the first write command elapse, the first data is written to the volatile memory chip.

8. The operation method of claim 7, further comprising controlling, by the controller, the read latency of the second data to have a constant deterministic characteristic.

9. The operation method of claim 7, further comprising sending, by the controller, before sending the first read command to the non-volatile memory chip, a non-volatile memory address of the second data requested to be read from the non-volatile memory chip.

10. The operation method of claim 7, further comprising sending, by the controller, before sending the first write command to the volatile memory chip, an active command to the volatile memory chip with reference to the cache address.

11. The operation method of claim 7, further comprising:
sending, by the controller, a second read command to the non-volatile memory chip with reference to a cache address of data requested to be read from the non-volatile memory chip;
sending, by the controller, a second write command to the volatile memory chip with reference to the first data requested to be read;
configuring, by the controller, the second data output from the non-volatile memory chip in response to the second read command as the first data, and controlling the first write data to be written to the volatile memory chip; and
applying the second write command to the volatile memory chip at a second time point of the write latency for the second write command when the second data is output to the second internal data lines after the read latency for the second read command after the second read command is applied.

12. The operation method of claim 7, further comprising:
receiving, by the controller, a non-volatile memory address of data requested to be read from the non-volatile memory chip and parity information of the non-volatile memory address;
restoring tag information indicating cache mapping between the non-volatile memory chip and the volatile memory chip by using the parity information of the non-volatile memory address; and
writing the first data to the volatile memory chip by the controller by using the cache address and the tag information.

13. An operation method of a memory module comprising a non-volatile memory chip, a volatile memory chip, and a controller, the operation method comprising:
sending, by the controller, a first command related to first data of the volatile memory chip to the volatile memory chip at a first time;
sending, by the controller, a second command related to second data of the non-volatile memory chip before the first data is output at a second time;
moving the first data from the volatile memory chip to the non-volatile memory chip at a time point when a first latency of the first command and a second latency of the second command coincide with each other whereby the time point occurs after latencies of the first command and the second command elapse, wherein the first data is configured by the controller at the time point as a first data chunk of a plurality of data chunks in a cache flush operation; and
moving the second data from the non-volatile memory chip to the volatile memory chip at the time point, wherein the second data is configured by the controller at the time point as the first data chunk of the plurality of data chunks in a cache fill operation.

14. The operation method of claim 13, further comprising:
receiving, through a command address bus outside the memory module, a write request directed to the non-volatile memory chip;
receiving, through the command address bus, a first read command directed to the volatile memory chip, the first read command associated with reference to a cache address of the second data requested to be written to the non-volatile memory chip;

sending the first read command to the volatile memory chip;

receiving, through the command address bus, a first write command related to a non-volatile memory address of the second data requested to be written to the non-volatile memory chip;

sending the first write command to the non-volatile memory chip;

configuring the first data output of the volatile memory chip after a read latency of the first read command as the second data after a write latency of the first write command; and controlling the second data to be written to the non-volatile memory chip.

15. The operation method of claim 14, further comprising:

receiving, through the command address bus, an active command directed to the volatile memory chip with reference to the cache address before the sending of the first read command to the volatile memory chip; and sending the active command to the volatile memory chip.

16. The operation method of claim 14, further comprising:

receiving, through the command address bus, the non-volatile memory address of data requested to be written to the non-volatile memory chip before the sending of the first write command to the non-volatile memory chip; and sending the non-volatile memory address to the non-volatile memory chip.

17. The operation method of claim 14, further comprising:

receiving, through the command address bus, a second read command directed to the volatile memory chip associated with the cache address;

sending the second read command to the volatile memory chip;

receiving, through the command address bus, a second write command associated with the non-volatile memory address;

sending the second write command to the non-volatile memory chip;

configuring the first data of the volatile memory chip output after the read latency of the second read command as the second data after the write latency of the second write command; and controlling the second data to be written to the non-volatile memory chip.

18. The operation method of claim 13, further comprising:

receiving, through a command address bus outside the memory module, a read request to the non-volatile memory chip;

receiving, through the command address bus, a first read command associated with a non-volatile memory address of data requested to be read from the non-volatile memory chip;

sending the first read command to the non-volatile memory chip;

receiving, through the command address bus, a first write command directed to the volatile memory chip, the first write command associated with a cache address of data requested to written to the volatile memory chip;

sending the first write command to the volatile memory chip;

configuring the second data read from the non-volatile memory chip output after a read latency of the first read command as the first data after a write latency of the first write command; and controlling the first data to be written to the volatile memory chip.

19. The operation method of claim 18, further comprising:

receiving, through the command address bus, the non-volatile memory address of the non-volatile memory chip before the sending of the first read command to the non-volatile memory chip;

sending the non-volatile memory address to the non-volatile memory chip;

receiving, through the command address bus, an active command directed to the volatile memory chip with reference to the cache address before the sending of the first read command to the volatile memory chip; and sending the active command to the volatile memory chip.

20. The operation method of claim 18, further comprising:

receiving, through the command address bus, a second read command associated with the non-volatile memory address;

sending the second read command to the non-volatile memory chip;

receiving, through the command address bus, a second write command related with the volatile memory chip, wherein the second write command refers to the cache address;

sending the second write command to the volatile memory chip;

configuring the second data of the non-volatile memory chip output after the read latency of the second read command as the first data after the write latency of the second write command; and controlling the first data to be written to the volatile memory chip.

* * * * *